United States Patent
Tidwell et al.

(10) Patent No.: US 9,094,140 B2
(45) Date of Patent: Jul. 28, 2015

(54) METHODS AND APPARATUS FOR AUDIENCE RESEARCH IN A CONTENT-BASED NETWORK

(75) Inventors: Justin Tidwell, Waxhaw, NC (US); Forrest Murphy, Saint Louis, MO (US); Bryan Santangelo, Sand Springs, OK (US); Steven Riedl, Superior, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1063 days.

(21) Appl. No.: 12/231,655

(22) Filed: Sep. 4, 2008

(65) Prior Publication Data

US 2010/0131969 A1     May 27, 2010

Related U.S. Application Data

(60) Provisional application No. 61/125,798, filed on Apr. 28, 2008.

(51) Int. Cl.
*H04N 21/433*     (2011.01)
*H04N 21/466*     (2011.01)
(Continued)

(52) U.S. Cl.
CPC ......... *H04H 60/31* (2013.01); *H04N 21/25808* (2013.01); *H04N 21/4334* (2013.01); *H04N 21/44222* (2013.01); *H04N 21/4667* (2013.01); *H04N 21/6582* (2013.01)

(58) Field of Classification Search
CPC .................. H04N 21/25808; H04N 21/4334; H04N 21/4667; H04N 21/6582; H04H 60/31; H04L 9/3242

USPC ......... 725/32, 34, 35, 46, 86–88, 91–97, 100, 725/105, 114–116, 118–120, 131, 139, 151, 725/9–11, 13, 14, 16, 37–39, 44, 47, 50, 12, 725/15; 705/50, 51, 64, 74, 14.4, 14.41, 705/14.44; 709/223, 224; 707/609, 610, 707/613–616, 620, 623, 624, 625
See application file for complete search history.

(56) References Cited

U.S. PATENT DOCUMENTS

| 4,905,080 A | 2/1990 | Watanabe et al. |
| 5,373,315 A | 12/1994 | Dufresne et al. |

(Continued)

FOREIGN PATENT DOCUMENTS

WO     WO 0163448 A2 *   8/2001   ............. G06F 17/00

*Primary Examiner* — Benjamin R Bruckart
*Assistant Examiner* — Jason Thomas
(74) *Attorney, Agent, or Firm* — Gazdzinski & Associates PC

(57) ABSTRACT

Methods and apparatus for accurate, secure and uniform exchange of audience research data. In one embodiment, viewership data is provided in real-time and offers the ability to monitor audience activities regarding, among others, broadcast, VOD or DVR content. A standardized message configuration is optionally used also to permit maximum uniformity and accessibility of the data. Accuracy of data exchange is enforced by implementing a method of detecting system failures, and the transmission of incomplete messages. Subscriber privacy and anonymity is also maintained via e.g., hashing or encrypting data relating to the CPE and/or subscriber, thus ensuring that stored data is not traceable to a specific user account. The methods and apparatus may also be utilized in conjunction with systems enabling the insertion and/or recommendation of content or advertising based on data collected regarding user actions or events. Business methods are also disclosed.

24 Claims, 24 Drawing Sheets

(51) Int. Cl.
*H04N 21/658* (2011.01)
*H04H 60/31* (2008.01)
*H04N 21/258* (2011.01)
*H04N 21/442* (2011.01)

(56) References Cited

U.S. PATENT DOCUMENTS

| | | | |
|---|---|---|---|
| 5,481,294 A | 1/1996 | Thomas et al. | |
| 5,497,185 A | 3/1996 | Dufresne et al. | |
| 5,793,409 A | 8/1998 | Tetsumura | |
| 5,812,642 A | 9/1998 | Leroy | |
| 5,974,299 A | 10/1999 | Massetti | |
| 6,202,210 B1 | 3/2001 | Ludtke | |
| 6,463,585 B1 * | 10/2002 | Hendricks et al. | 725/35 |
| 6,467,089 B1 | 10/2002 | Aust et al. | |
| 6,647,548 B1 | 11/2003 | Lu et al. | |
| 6,681,393 B1 | 1/2004 | Bauminger et al. | |
| 7,039,928 B2 | 5/2006 | Kamada et al. | |
| 7,139,723 B2 | 11/2006 | Conkwright et al. | |
| 7,146,329 B2 | 12/2006 | Conkwright et al. | |
| 7,167,877 B2 * | 1/2007 | Balogh et al. | 707/615 |
| 7,197,472 B2 | 3/2007 | Conkwright et al. | |
| 7,222,078 B2 | 5/2007 | Abelow | |
| 7,356,751 B1 | 4/2008 | Levitan | |
| 7,590,997 B2 * | 9/2009 | Diaz Perez | 725/109 |
| 7,602,820 B2 | 10/2009 | Helms | |
| 7,765,563 B2 | 7/2010 | Bauminger et al. | |
| 7,890,653 B2 | 2/2011 | Kutsumi et al. | |
| 8,065,703 B2 * | 11/2011 | Wilson et al. | 725/34 |
| 2003/0056217 A1 | 3/2003 | Brooks | |
| 2004/0143661 A1 * | 7/2004 | Higashi et al. | 709/224 |
| 2005/0039205 A1 | 2/2005 | Riedl | |
| 2005/0204385 A1 * | 9/2005 | Sull et al. | 725/45 |
| 2005/0278731 A1 * | 12/2005 | Cameron et al. | 725/14 |
| 2006/0294259 A1 | 12/2006 | Matefi et al. | |
| 2007/0022459 A1 * | 1/2007 | Gaebel et al. | 725/114 |
| 2007/0074258 A1 * | 3/2007 | Wood et al. | 725/105 |
| 2007/0094691 A1 * | 4/2007 | Gazdzinski | 725/62 |
| 2007/0162923 A1 * | 7/2007 | Silveira Da Motta | 725/14 |
| 2007/0174877 A1 * | 7/2007 | Papillon et al. | 725/86 |
| 2007/0217436 A1 | 9/2007 | Markley | |
| 2007/0276926 A1 | 11/2007 | LaJoie | |
| 2008/0112405 A1 | 5/2008 | Cholas | |
| 2008/0148317 A1 * | 6/2008 | Opaluch | 725/46 |
| 2008/0155589 A1 * | 6/2008 | McKinnon et al. | 725/34 |
| 2008/0171598 A1 * | 7/2008 | Deng | 463/40 |
| 2009/0019473 A1 | 1/2009 | Lawson et al. | |
| 2009/0210899 A1 | 8/2009 | Lawrence-Apfelbaum | |

* cited by examiner

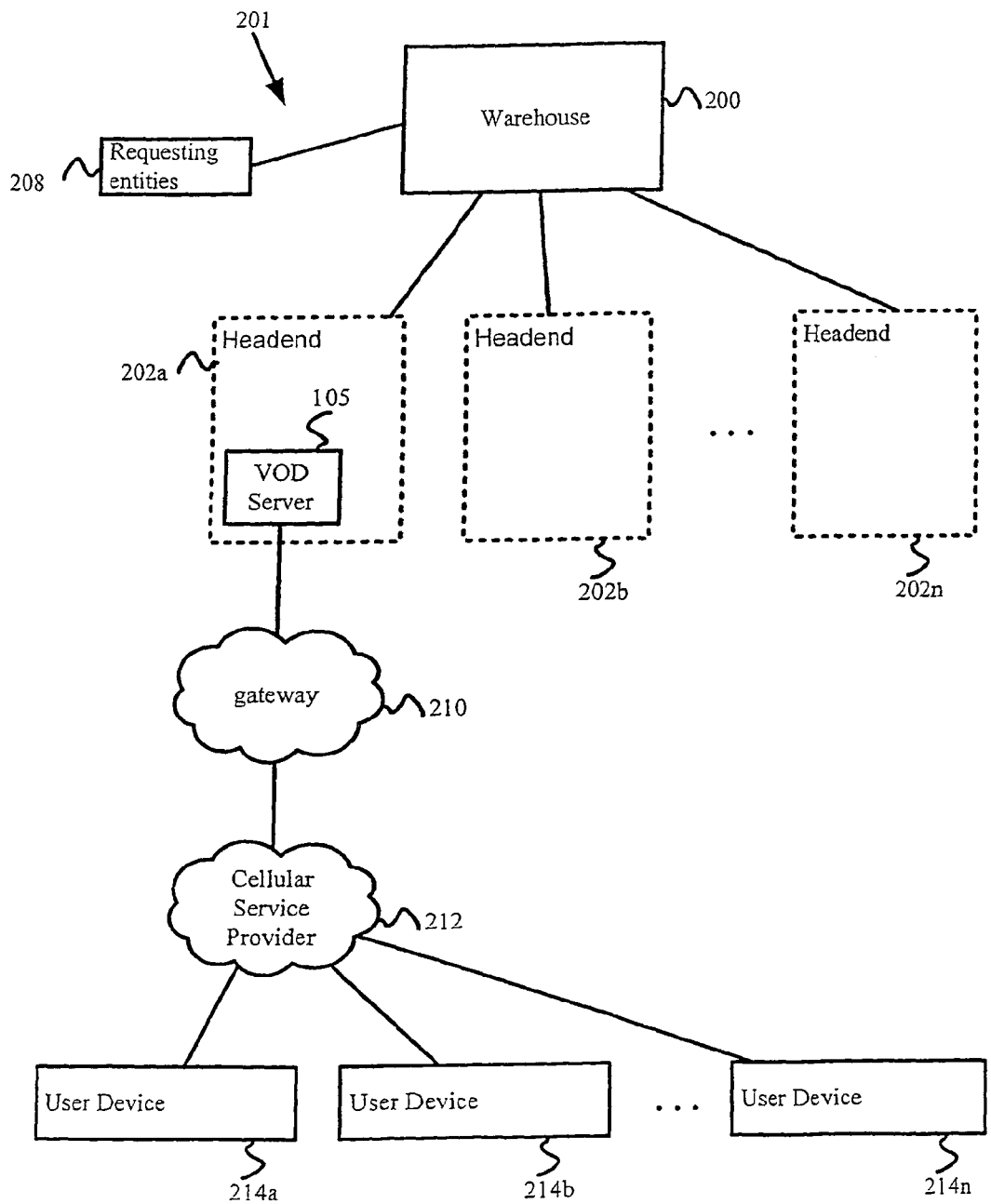

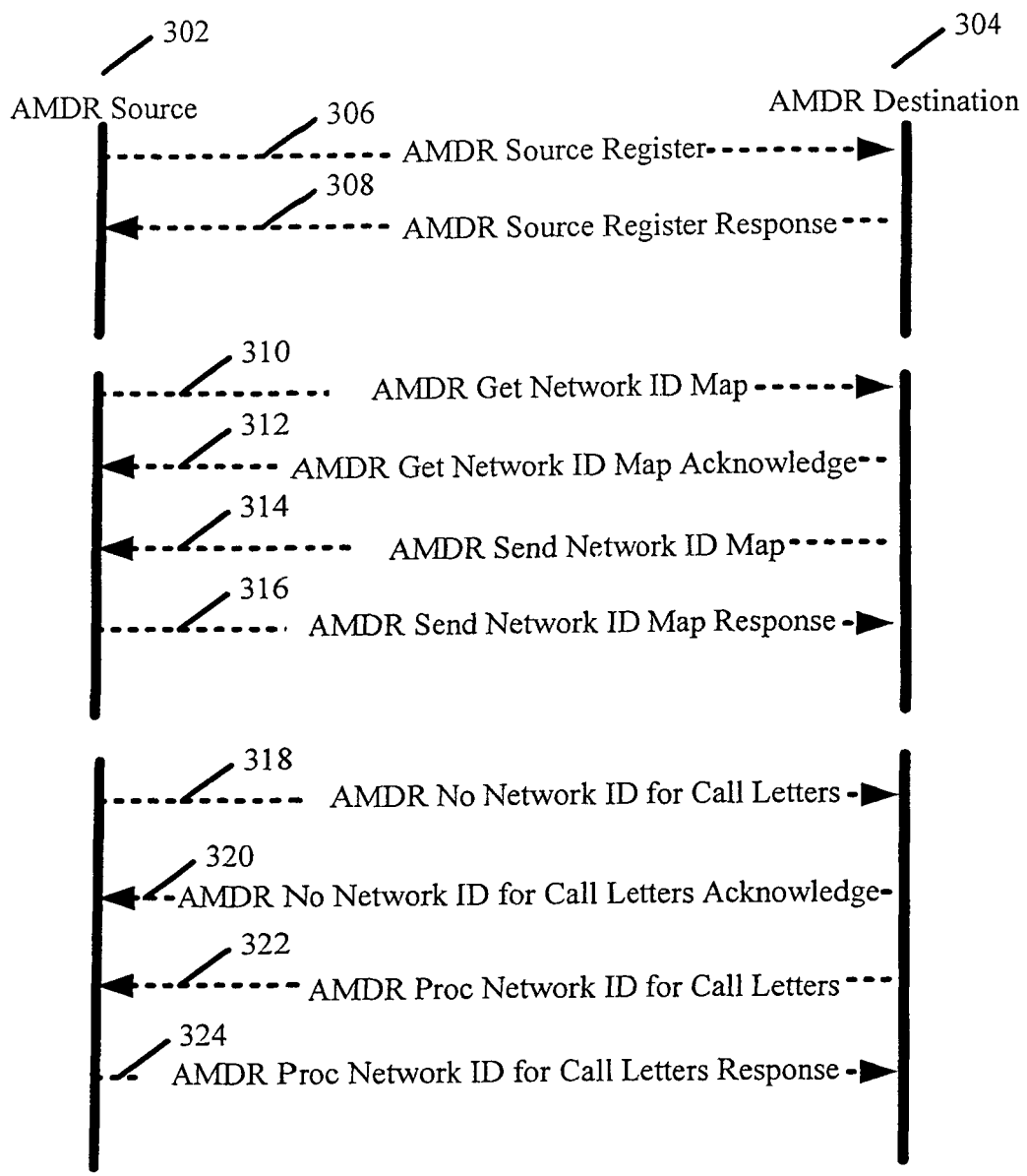

_US 9,094,140 B2_

METHODS AND APPARATUS FOR AUDIENCE RESEARCH IN A CONTENT-BASED NETWORK

PRIORITY

This application claims priority to co-owned U.S. Patent Provisional Application Ser. No. 61/125,798, filed Apr. 28, 2008, and entitled "Methods and Apparatus for Audience Research in a Content-Based Network", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computer-assisted data manipulation and analysis. More specifically, the present invention relates in one exemplary aspect to methods and apparatus for exchange of audience research data in a content-based network such as a cable television or satellite network.

2. Description of Related Technology

The well-known "Nielsen Ratings" are ratings determined by measuring of the number of unique viewers or households tuned to a television program at any one particular time. Nielsen ratings utilize audience measurement systems to determine audience size and other related statistics. The Nielsen system has historically been the primary source of audience measurement information in the television industry, and thus affects various aspects of television including inter alia, advertising rates, schedules, viability of particular shows, etc. The Nielsen system has also recently been expanded from only program content to advertising (i.e., Nielsen ratings may be provided for advertisements themselves).

Nielsen Ratings are generally gathered in one of two ways. One method involves asking viewers of various demographics to keep a written record of the television shows they watch throughout the day and evening. Another method involves using "set meters," which are small devices connected to televisions in selected homes. These devices electronically gather the viewing habits of the home and transmit the information nightly to Nielsen or a proxy entity over a connected phone line or other connection.

There are several disadvantages with employing a Nielsen-like approach to gathering audience research data. A first such disadvantage is that the sample of viewers selected may not be fairly representative of the population of cable viewers as a whole. For example, in a cable network comprising four million cable viewers, a sample of any 100,000 viewers may exhibit different average viewing habits than the averages associated with the other 3,900,000 cable viewers who are not in the sample.

A second disadvantage is that static delivery makes it difficult to perfectly target an audience known to be in the market. For example, suppose that the ideal target for a sports car advertisement is the set of all consumers who like and would be interested in buying sports cars. If all that is known from Nielsen data is that 10% of the sample group has watched the auto-racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

The aforementioned prior art "Nielsen" approach is also program-specific, and this is problematic from the standpoint that this program-coupled approach is only as good as the underlying demographic correlation model.

Also, the aforementioned demographic model is often limited to one particular program. Hence, 18-30 year old females may tune in dutifully to American Idol each broadcast (e.g., Monday at 8:00 pm), but may not have any interest in watching the program immediately preceding or following American Idol, and hence may tune away (or delay tuning to that channel until the start of American Idol). Currently, no mechanism exists for accurately representing a specific demographic model not just for individual programs, but for times of the day, individual program channels, etc.

A number of other different approaches have been described in the prior art which attempt to gather and transmit audience research data. For example, U.S. Pat. No. 4,905,080 to Watanabe, et al. issued Feb. 27, 1990 and entitled "Apparatus for Collecting Television Channel Data and Market Research Data" discloses a data collecting apparatus used in a survey system in which research data such as television audience ratings and market research data is collected by a data collecting device provided in each of a plurality of panelists' homes, the collected research data is sent to a data center through telephone links, and, at the data center, the data is processed with the aid of a large scale computer to calculate desired research data. The data collecting apparatus includes a channel detector for detecting a television channel being viewed, a market research data entry device, a personal data entry device, and a data processing device for storing and processing the entered data. The detected channel data and the entered personal data are transferred to the data processing device via domestic power supply lines. The market research data is efficiently entered with the aid of a bar-code reader and a keyboard in a sequence-non-ordered manner. The personal data is entered with an entry device using infrared light. The personal data entry device may have picture-like illustration images of respective panelists so that they need not remember personal identification numbers.

U.S. Pat. No. 7,222,078 to Abelow issued May 22, 2007 and entitled "Methods and Systems for Gathering Information from Units of a Commodity Across a Network" discloses an exemplary system wherein information is received at a central location from different units of a commodity. The information is generated from two-way local interactions between users of the different units of the commodity and a user interface in the different units of the commodity. The interactions elicit from respective users their perceptions of the commodity.

U.S. Pat. No. 7,197,472 to Conkwright, et al. issued Mar. 27, 2007 and entitled "Market Data Acquisition System" discloses a system and method for using inverse mathematical principles in the analysis of compatible datasets so that correlations and trends within and between said datasets can be uncovered. The present invention is tailored to the analysis of datasets that are extremely large; result from passive, privacy-secure, or anonymous, data collection; and are relatively unbiased. Correlations and trends uncovered by such analysis can be further examined by data mining and prediction portions of the present invention, which uncover and make use of interrelated rules that determine data structures. An embodiment directed toward analysis of television viewership and marketing data that does this while still respecting privacy concerns is disclosed.

U.S. Pat. No. 6,681,393 to Bauminger, et al. issued Jan. 20, 2004 and entitled "Viewer Interaction Feedback Method and System for use with an Interactive Telecommunication System" discloses a viewer response method for use with an interactive telecommunications system. The viewer response method includes accumulating a user interaction history of a user of the system, the user interaction history including user interaction information associated with a plurality of user interaction events and providing user-sensible feedback, based at least in part on the user interaction history.

U.S. Pat. No. 6,647,548 to Lu, et al. issued Nov. 11, 2003 and entitled "Coded/Non-Coded Program Audience Measurement System" discloses an audience measurement system which identifies a program which is broadcast from a signal source and to which a receiver is tuned. The audience measurement system includes a code reader for reading an ancillary code of the program to which the receiver is tuned, a channel status detector for determining channel status relating to channels to which the receiver is tuned, a memory for storing ancillary codes read by the code reading means and for storing channel status determined by the channel status determining means if ancillary codes are not readable by the code reading means, and a communicator for communicating the ancillary code and/or the channel status to a central office computer.

U.S. Pat. No. 6,202,210 to Ludtke issued Mar. 13, 2001 and entitled "Method and System for Collecting Data Over a 1394 Network to Support Analysis of Consumer Behavior, Marketing and Customer Support" discloses a data collection system for use with a home AV network. The home AV network includes a plurality of consumer electronic devices communicatively coupled via an IEEE 1394 based network. A receiver device is included in the plurality of devices. The receiver device functions by receiving a broadcast data stream for displaying or playing for the user, wherein the broadcast data stream includes an identifier tag describing the identity or content of the broadcast data stream. At least one of the plurality of consumer electronic devices includes an up-stream communications link capable of sending information up-stream from the user's home. Additionally, at least one of the consumer electronic devices includes a computer system, the computer system including a processor coupled to a memory via a bus. The memory stores software which when executed by the processor causes the computer system to implement a data collection method comprising the steps of monitoring the identifier tag included in the broadcast data stream, determining an identity of the broadcast data stream using the identifier tag, and transmitting the identity of the broadcast data stream to an external monitor via the up-stream communications link.

U.S. Pat. No. 5,793,409 to Tetsumura issued Aug. 11, 1998 and entitled "Apparatus for grasping TV viewing condition in household" discloses an audience state measuring apparatus of a television including an existence sensor (2) for detecting the number of persons (3) near a television receiver (1), a setter (4) for registering who is or are watching the program which is being broadcasted and an alarm lamp (6) for reporting that the number of persons from the existence sensor (2) and the registered number from the setter are inconsistent. This apparatus makes it possible to determine who among one family is or are watching the specific program which is being broadcasted and to measure accurately the individual audience state because non-registration in the setter (4) is reported to the persons (3).

U.S. Pat. No. 7,356,751 to Levitan issued Apr. 8, 2008 and entitled "Error handling and audience measurement in datacast network with return channel" discloses a data broadcast network with a return channel providing a guaranteed error-free data delivery simultaneously to multiple receiving devices. The network transmits data in packets and uses the return channel for audience measurement and packets recovery. Whenever a corrupted packet is detected, the multiple receiving devices play a kind of "lottery game" running generators of random numbers, and only "winners" submit retransmission requests over the return channel. While in the game each receiver acts on its own, it is advised by the sender on the audience size, i.e. the overall number of receivers. It allows setting the game so to limit the number of retransmission requests to just a few and to keep it independent from the audience size. The sender performs the audience measurement by transmitting packets with wrong error-checking values and evaluating receivers' responses.

U.S. Pat. No. 7,039,928 to Kamada, et al., issued May 2, 2006 and entitled "Method and device for obtaining audience data on TV program" discloses a TV program table data in the area where a viewer resides are received through the Internet or a broadcasting medium by using the TV set with an internet connection function at the viewer. While the viewer is watching a TV program, the audience data including viewed channel information and viewed time information are automatically obtained. The obtained audience data are compared with the TV program table data to identify the watched program. The program ID of the identified program and the viewed time information are transferred to a data collecting center through the Internet together with the viewer ID data. By utilizing the Internet for the distribution of the TV program table data to the viewers and for the collection of the audience data, the nationwide TV audience data can be easily collected and used to make statistics. Since viewed channel and viewed time information are correlated with programs on the viewer's side, the load of processing the data on the center side can be relieved.

U.S. Pat. No. 6,467,089 to Aust, et al., issued Oct. 15, 2002 and entitled "Audience measurement system incorporating a mobile handset" discloses an audience measurement system for a receiver comprises monitoring equipment, such as a decoder, ON/OFF detector and transmitter, coupled to the receiver. The decoder reads program codes embedded in a program received by the receiver. The system also comprises a base unit and a mobile unit, such as a telephone handset. The handset receives the program codes transmitted from the decoder and prompts (via a visual display or audio tone) an audience member to enter personal data (i.e. who the audience member is) via a keypad or voice input. The program data (from the decoder) and personal data (input by the audience member) is provided to the base unit, where it is time stamped and stored. The base unit includes telephone circuitry to transmit the stored data to a data collection central facility via a public switched telephone network. If no program codes are found or if the monitoring equipment is eliminated, the mobile unit prompts the audience member to enter program data that may be selected from a previously downloaded program schedule.

U.S. Pat. No. 5,974,299 to Massetti issued Oct. 26, 1999 and entitled "Audience rating system for digital television and radio" discloses an audience rating system for digital television and radio, using identification codes in control streams of time-multiplexed digital transmissions. When a television set or radio, that is being monitored pursuant to the system, is turned on and tuned into a channel, and each time that the channel is changed, an identification code for each audio, video or auxiliary digital stream of the channel is extracted from the control stream, and recorded along with the time. The time is also recorded when the television set or radio is turned off. This data makes it possible to determine what stations, channels, and programs members of the audience being monitored are watching or listening to at any particular time. In the first preferred embodiment, the multiplexed digital transmission is received separately by the television set or radio (or an attached IRD) and a meter connected to it. The meter compares digital streams of the channel being received by the television set or radio with digital streams of each of the channels in the multiplexed digital transmission, until it finds a match. In the second preferred embodiment, the meter does not receive the multiplexed digital transmission separately, but has access to elementary streams extracted from the transmission by an IRD, and extracts identification codes for the channels being received from their elementary streams. The elementary stream may be accessed through an auxiliary connector in a digital decoder, through an access control card connector, or through soldering electrical connections to internal points in the IRD.

U.S. Pat. No. 5,812,642 to Leroy, issued Sep. 22, 1998 and entitled "Audience response monitor and analysis system and method" discloses a system and method are provided for monitoring and analyzing audience response to a broadcast promotion. The specific embodiment for fund-raising campaigns for public television stations is addressed, wherein the taking of pledges over the telephone is automated, the response data entered directly into a computer with the use of scripted screens. The effectiveness of segments of the campaign is calculated by correlating the response data, including the number of telephone calls received, with each promotion segment. Additional methods of manipulating and displaying response data are also disclosed, including the use of demographic and audience ratings to provide an indication of the effectiveness of a promotion segment.

U.S. Pat. No. 5,497,185 to Dufresne, et al., issued Mar. 5, 1996 and entitled "Remote control system for television audience data gathering" discloses a method and apparatus of collecting data from a television audience comprising storing in a first memory demographic descriptions of expected viewers of a television receiver, receiving signals from a viewer control operated by a viewer, displaying one or more indicia on a television screen for viewing by the viewer, designated by the character of the signals received from the control, in confirmation of the particular signal received from the control, and storing a signal in a second memory for later access corresponding to at least one form of the designated signal character, which is related to the designation of at least one selected expected viewer as an active viewer. The television viewer may use his remote control at any time, when the flashing prompt is flashing, or when it is not flashing, to change channels. There is no channel lock nor is there an annoying on-screen prompt enquiring as to the identity of persons in the viewing audience.

U.S. Pat. No. 5,481,294 to Thomas, et al., issued Jan. 2, 1996 and entitled "Audience measurement system utilizing ancillary codes and passive signatures" discloses an audience measurement system collects data representative of tuned programs rather than of tuned channels, and includes (i) a household metering apparatus which records ancillary codes or extracts program signatures from the programs if no ancillary codes are found therein, (ii) a reference apparatus which monitors broadcast programs to be monitored, which extracts reference signatures therefrom, which records whatever ancillary codes may be associated with these broadcast programs and, if no ancillary codes are present, which compresses and stores a digital replica representative of the broadcast programs to be monitored, (iii) a data collection apparatus which compares the household and reference data to determine (a) which of the broadcast programs to be monitored were selected for viewing and/or listening, (b) which of the metered households selected the broadcast programs to be monitored for viewing and/or listening, and (c) at which times the broadcast programs to be monitored were selected for viewing and/or listening.

U.S. Pat. No. 5,373,315 to Dufresne, et al., issued Dec. 13, 1994 and entitled "Television audience data gathering" discloses a method and apparatus of collecting data from a television audience comprising storing in a first memory demographic descriptions of expected viewers of a television receiver, receiving signals from a viewer control operated by a viewer, displaying one or more indicia on a television screen for viewing by the viewer, designated by the character of the signals received from the control, in confirmation of the particular signal received from the control, and storing a signal in a second memory for later access corresponding to at least one form of the designated signal character, which is related to the designation of at least one selected expected viewer as an active viewer. The television viewer may use his remote control at any time, when the flashing prompt is flashing, or when it is not flashing, to change channels. There is no channel lock nor is there an annoying on-screen prompt enquiring as to the identity of persons in the viewing audience.

United States Patent Publication No. 20060294259 to Matefi, et al., issued Dec. 28, 2006 and entitled "Method and device for audience monitoring on multicast capable networks" discloses a cheap solution for audience monitoring in multicast capable networks e.g. Ethernet, IP or UMTS. There is no need for user equipment in order to monitor the viewers' watching behavior. The measurement is done in the operator's network; therefore, there is no need to contact the end user. The idea can be applied in systems comprising multicast capable network contention server, network devices and user equipment. The content is carried in data packets to the end user. The network devices are remote manageable. The user can choose between several contents. The aim is to measure the user statistics regarding the chosen content. According to the invention it is enough to place a measurement host with our proposed software block in the network, which collects data from the network devices in the edge of the network periodically in order to make a content access survey.

Despite the foregoing approaches, there is a need for improved methods and apparatus which more accurately, securely and uniformly generate and exchange audience measurement data. Such improved methods and apparatus would ideally be adapted to produce data records in real-time with associated viewership actions. Ideally, these methods and apparatus would be able to monitor multiple sources of content to which viewership behavior relates, would leverage substantially extant network infrastructure and components, and would be compatible with a number of different client device and delivery systems including both wired and wireless technologies.

Subscriber anonymity or privacy (i.e., no use of personally identifiable information) would also ideally be maintained.

SUMMARY OF THE INVENTION

The present invention addresses the foregoing needs by providing methods and apparatus adapted to increase the effectiveness of advertising or promotional content to be delivered over a network to one or more network devices and associated users.

In a first aspect of the invention, an audience measurement system (AMS) is disclosed. The AMS enables sending messages regarding audience viewership between various entities of the network. In one embodiment, the AMS comprises one or more source entities and one or more destination entities in data communication with one another via a cable network. In one variant, audience research data is collected at the source entities and delivered to the destination entities in the form of an audience measurement data record (AMDR).

In another embodiment, the AMS comprises: a data warehouse; one or more headend entities in data communication with the data warehouse; one or more hub entities in data communication with the one or more headend entities, the hub entities comprising at least one switched digital server; and one or more CPE in data communication with the one or more hub entities. According to this embodiment, data is collected at the switched digital server regarding audience viewership occurring on the CPE and is then transmitted to the headend entities. The headend entities are adapted to send the data to the data warehouse. In one variant, data is collected at the VOD servers regarding VOD-related audience viewership occurring on the CPE and is then transmitted to the headend entities. In another variant, the data is securely transferred. In yet another variant, the data is collected at the data warehouse into one or more user profiles.

In another embodiment, the AMS comprises: a data warehouse; one or more headend entities in data communication with the data warehouse, the headend entities comprising at least one VOD server; a cellular service provider network; and one or more mobile user devices in data communication with the VOD server via the cellular service provider network. In one embodiment, a gateway network is further provided to assist in the communication between the VOD server and the mobile user devices.

In yet another embodiment, the AMS comprises: a data warehouse; one or more headend entities in data communication with the data warehouse; one or more hub entities in data communication with the one or more headend entities; one or more CPE in data communication with the one or more hub entities, wherein the CPE comprises a home network having various media devices in communication therewith. According to this embodiment, data is collected by the CPE regarding audience viewership at any of the home network media devices and is transmitted to the data warehouse.

In a second aspect of the invention, the AMS employs a system to ensure unambiguous communication between the various entities of the network. In one embodiment, the system comprises establishing a source entity and a destination entity, transmitting a map of network identification numbers from one entity to the other, and ensuring that the map of network identification numbers is identical to an internal reference. In one variant, the internal reference comprises a listing of television station call letters, and the map of network identification is listed by television station call letters. In another variant, the act of ensuring that the map of network identification numbers is identical to an internal reference comprises ensuring that each of the television station call letters matches to one network identification number.

In a third aspect of the invention, a method for generating a self-describing message is disclosed. In one embodiment, the method comprises: triggering event occurring; selecting an event descriptor to describe the triggering event; enriching the record; pseudonymizing the record; and enriching the record a second time. In one variant, the first act of enriching comprises associating with the record certain data, the data relating to the MAC address of the entity on which the event occurred. In another variant, the act of pseudonymizing comprises: running a salted hash of the MAC ID; running a salted hash of the Customer ID or Division ID; joining the hash sums to the header of the event record and utilizing public/private key pair encryption on the message as a whole. In another variant, the second act of enriching comprises associating to the record data which does not require knowledge of the MAC address of the entity on which the event occurred.

In another embodiment, the method further comprises utilizing the first enriched record for comparison in one or more systems which are adapted to generate targeted content.

In yet another embodiment, the method further comprises preparing the record for conveyance via one or more staging and/or processing steps.

In a fourth aspect of the invention, a self-describing message is disclosed. In one embodiment, the message comprises a uniform header portion, a body and a cyclic redundancy check portion. In one variant, the uniform header portion comprises a version identification, a transaction identification, a transaction type descriptor, and a date/time stamp.

In a fifth aspect of the invention, the AMS employs a system to ensure proper connectivity between the communicating entities of the network. In one embodiment, the system comprises sending one or more heartbeat messages from a source entity to a destination entity and acknowledging the receipt of the one or more heartbeat messages, wherein failure to perform one of the above steps results in failure notification to an administrator. In one variant, the heartbeat messages are sent at pre-set intervals.

In a sixth aspect of the invention, a method for the collection of data from a single user or household into one or more profiles is given. In one embodiment the method comprises: occurrence of a triggering event; generation of an event message; determination of the existence of a previously created profile; addition of the event message to the previously created profile or alternatively to the newly created profile; pseudonymization of the profile; and storage of the profile. In one variant, the act of adding the event message to the newly created profile comprises enrichment from a billing system extract, the contents of which have no personally identifiable information (e.g., are keyed off of the same Customer ID/Division ID salted one-way hash and MAC address one way hash that was used for the AMDR). In another variant, the act of adding the event message to the previously created profile comprises updating the previously created profile, the act of updating comprising: configuration information if necessary, adding the new event data from the body of the event message, and adding billing data. In yet another embodiment, the method further comprises making a copy of the profile prior to pseudonymization for use in systems adapted to compare the profile to available content for the identification of content targeted thereto.

In a seventh aspect of the invention, a data destination is disclosed. In one embodiment, the data destination comprises: at least one event data mart adapted to store event data; at least one profile data mart adapted to store at least one user profile; a digital processor, said processor adapted to run at least one computer program thereon, the computer program adapted to generate one or more user profile associated with at least one user; and an interface.

In an eighth aspect of the invention, a data source is disclosed. In one embodiment, the data source comprises: a means for collecting data; a digital processor, said processor adapted to run at least one computer program thereon, the computer program adapted to generate an event message for each piece of data collected; and an interface.

In a ninth aspect of the invention, a data intermediary is disclosed. In one embodiment, the data intermediary comprises: a means for receiving data; a means for storing data; and a means for sending data.

In a tenth aspect of the invention, a means of ensuring user anonymity during data collection and transfer is given. In one embodiment, the method comprises running a salted hash function of the MAC ID of an entity on which an event occurred; running a salted hash function of the Customer ID and/or Division ID (e.g., a concatenated version thereof) of an entity on which an event occurred; combining the hash sums of the hash functions to generate a hashed header to an event message; encrypting the event message. In one variant, the event message is encrypted via a public/private key pair encryption method.

In an eleventh aspect of the invention, a method of doing business in a cable network is given. In one embodiment, the method comprises giving a customer an option to have audience research data passively and anonymously collected; giving a customer an option to have said research data utilized in the generation of customer-specific targeted content; analyzing said passively and anonymously collected data; sending the analyzed data to a requesting entity. In one variant, the act of analyzing said data comprises generating one or more reports regarding viewership for individual ones of a plurality of programs presented to the customer. In another variant, the act of giving a customer an option to have audience research data collected and the act of giving a customer an option to have the data utilized comprise offering the customer incentives.

These and other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2a is a functional block diagram illustrating another exemplary AMS in accordance with the present invention.

DETAILED DESCRIPTION OF THE INVENTION

Figure 1:
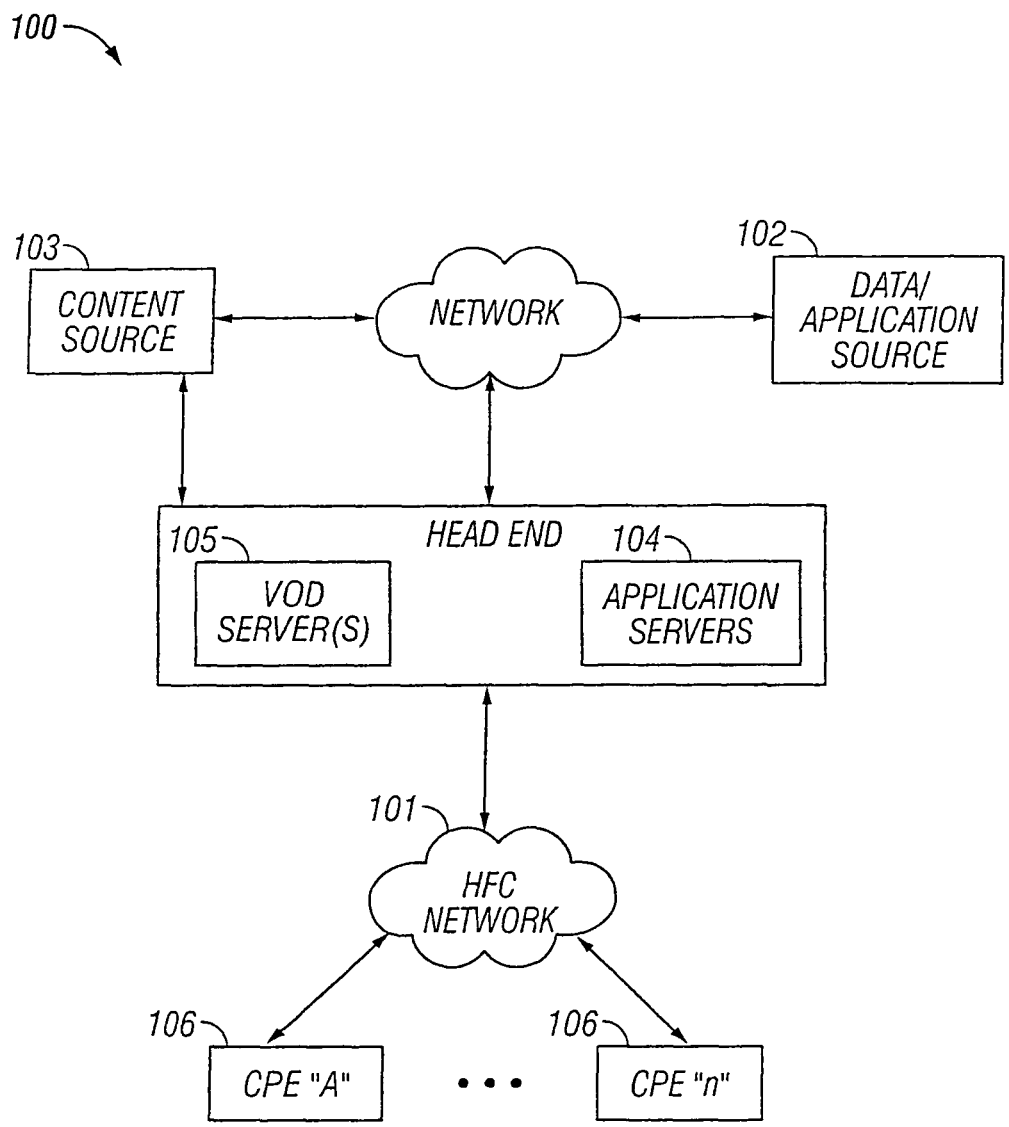
FIG. 1 is a functional block diagram illustrating an exemplary HFC cable network configuration useful with the present invention.

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421 M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another form comprises a subscription or installment plan. Yet a further form comprises providing a limited time option Myriad other forms of consideration will be appreciated by those of ordinary skill given the present disclosure.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, Cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "display element" refers to any user interface (UI) or other structure adapted to be displayed on a display device including without limitation windows, icons, objects, "tickers" or menus.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802,3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to said schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi (such as IEEE-Std. 802.11 or related standards including 802.11 a/b/g/n), Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for accurate, secure and uniform exchange of audience or viewer research data.

The present invention overcomes the disabilities of the previously discussed models in that it provides viewership data in real-time, and offers the ability to monitor audience activities regarding, inter alia, broadcast, VOD, and DVR content. It further provides for uniformity of data messages sent and received via the insertion of a common header portion. The apparatus is further adapted to detect system failures, and detect the transmission of incomplete messages.

Moreover, the methods and apparatus of the present invention may also advantageously be utilized with systems adapted for the insertion and/or recommendation of advertising or content (e.g., "targeted" advertising or content insertion systems or recommendation engines within a cable network).

Subscriber privacy and anonymity is also maintained via e.g., hashing or encrypting data relating to the CPE and/or subscriber, thus ensuring that stored data is not traceable to a specific user account. In alternative embodiments, only information designated by a consumer is eligible for content collection and/or analysis. In this manner, subscriber privacy is effectively safeguarded, and user control of their private information (including for example preferences or user profile) is protected as well.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having a multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented for example using QAM, orthogonal frequency division multiplexing (OFDM), sigma-delta modulation (SDM), time-division multiplexing (TDM), etc.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Bearer Network Architecture—

FIG. 1 illustrates a typical content-based network configuration with which the audience research apparatus and methods of the present invention may be used. The various components of the network 100 include (i) one or more data and application origination points 102; (ii) one or more content sources 103, (iii) one or more application distribution servers 104; (iv) one or more VoD servers 105, and (v) customer premises equipment (CPE) 106. The distribution server(s) 104, VoD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VoD servers, and/or CPE (as well as different network topologies) may be utilized consistent with the invention. For example, the headend architecture of FIG. 1a (described in greater detail below) may be used.

The data/application origination point 102 comprises any medium that allows data and/or applications (such as a VoD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VoD server 105 comprises a computer system where on-demand (OD) content can be received from one or more of the aforementioned data sources 102 and enters the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
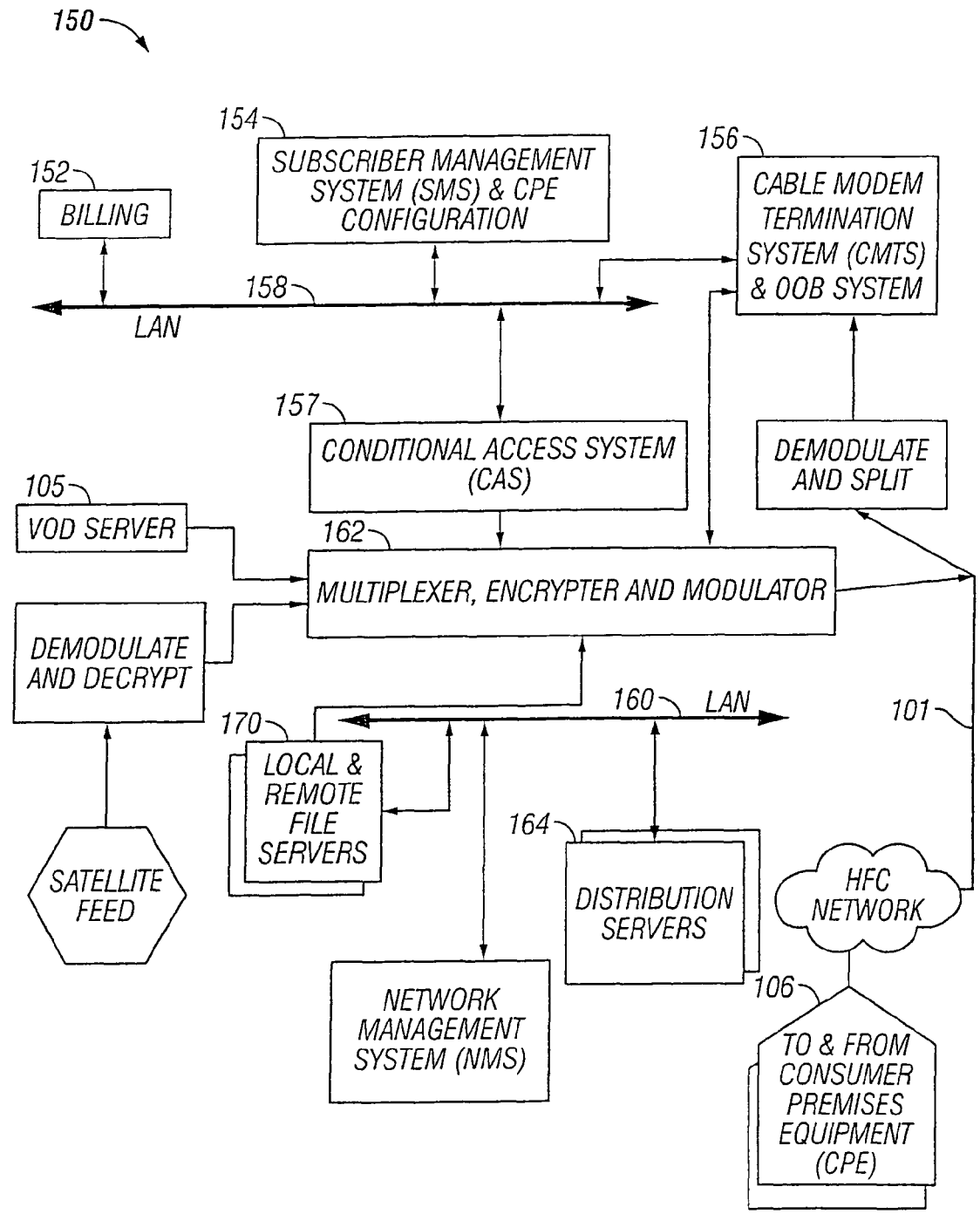
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
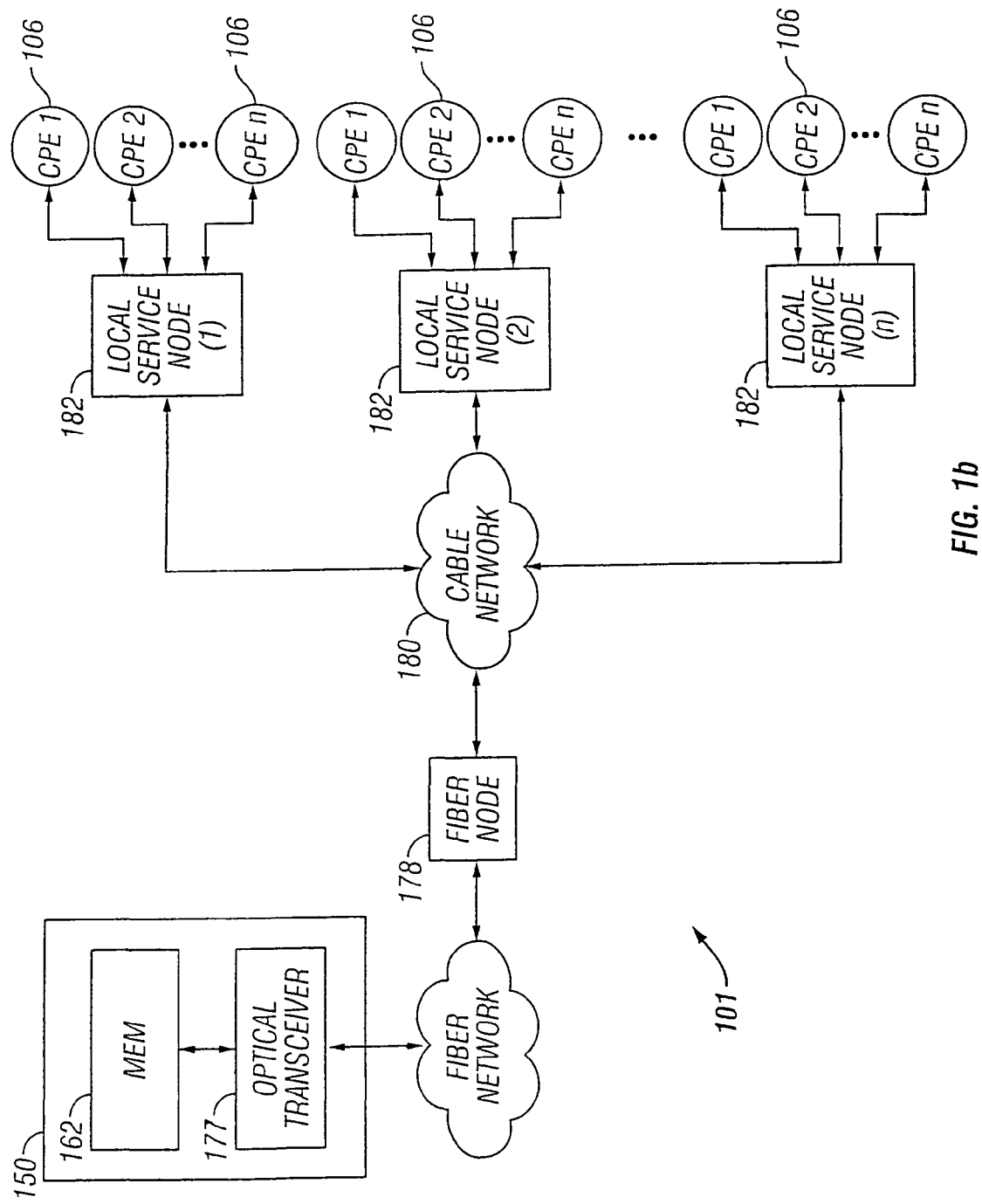
FIG. 1b is a functional block diagram illustrating one exemplary local service node configuration useful with the present invention.

The exemplary architecture 150 of FIG. 1a further includes a multiplexer/encrypter/modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
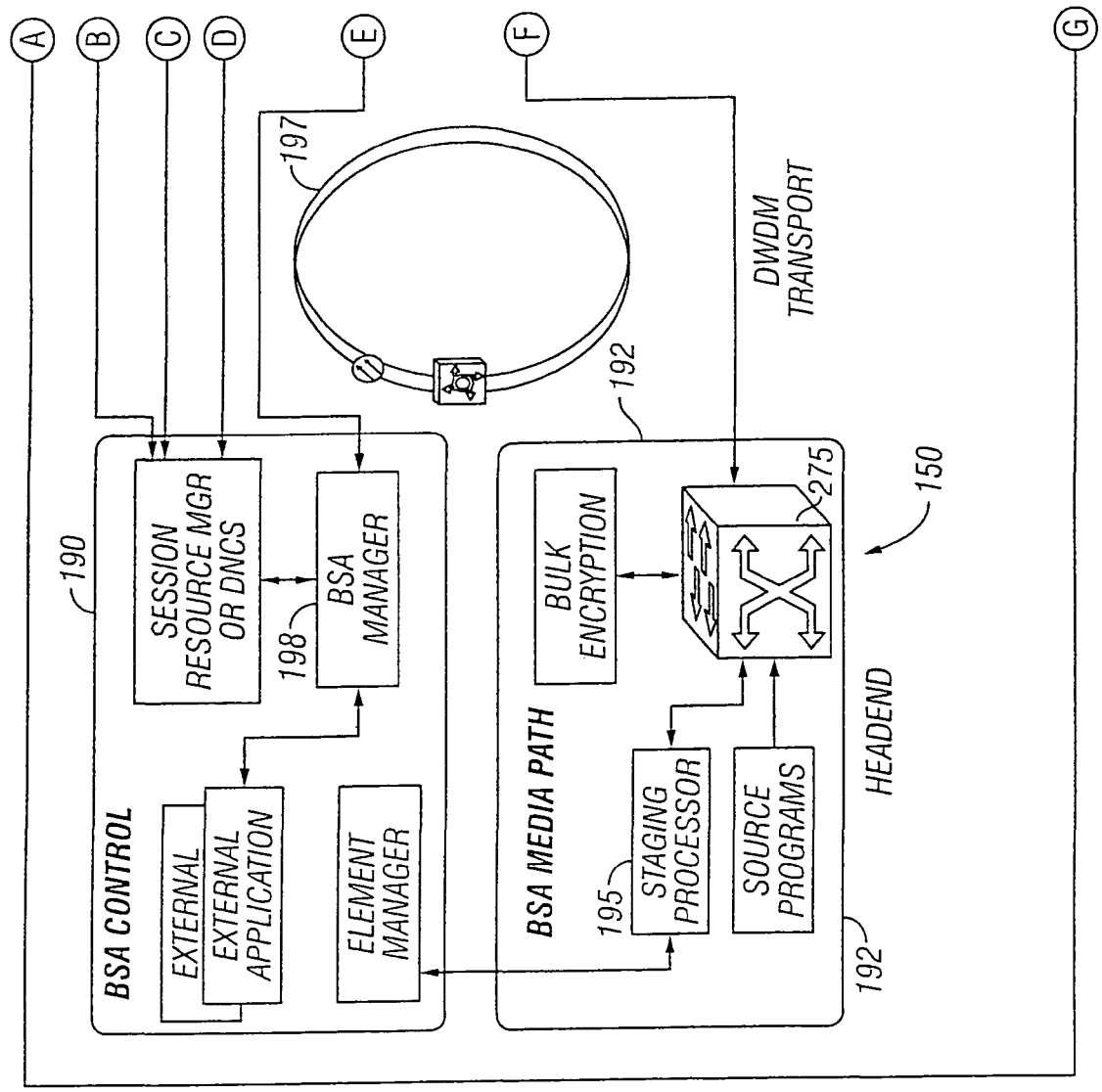
FIG. 1c is a functional block diagram illustrating one exemplary broadcast switched architecture (BSA) network useful with the present invention.
Figure 1C:
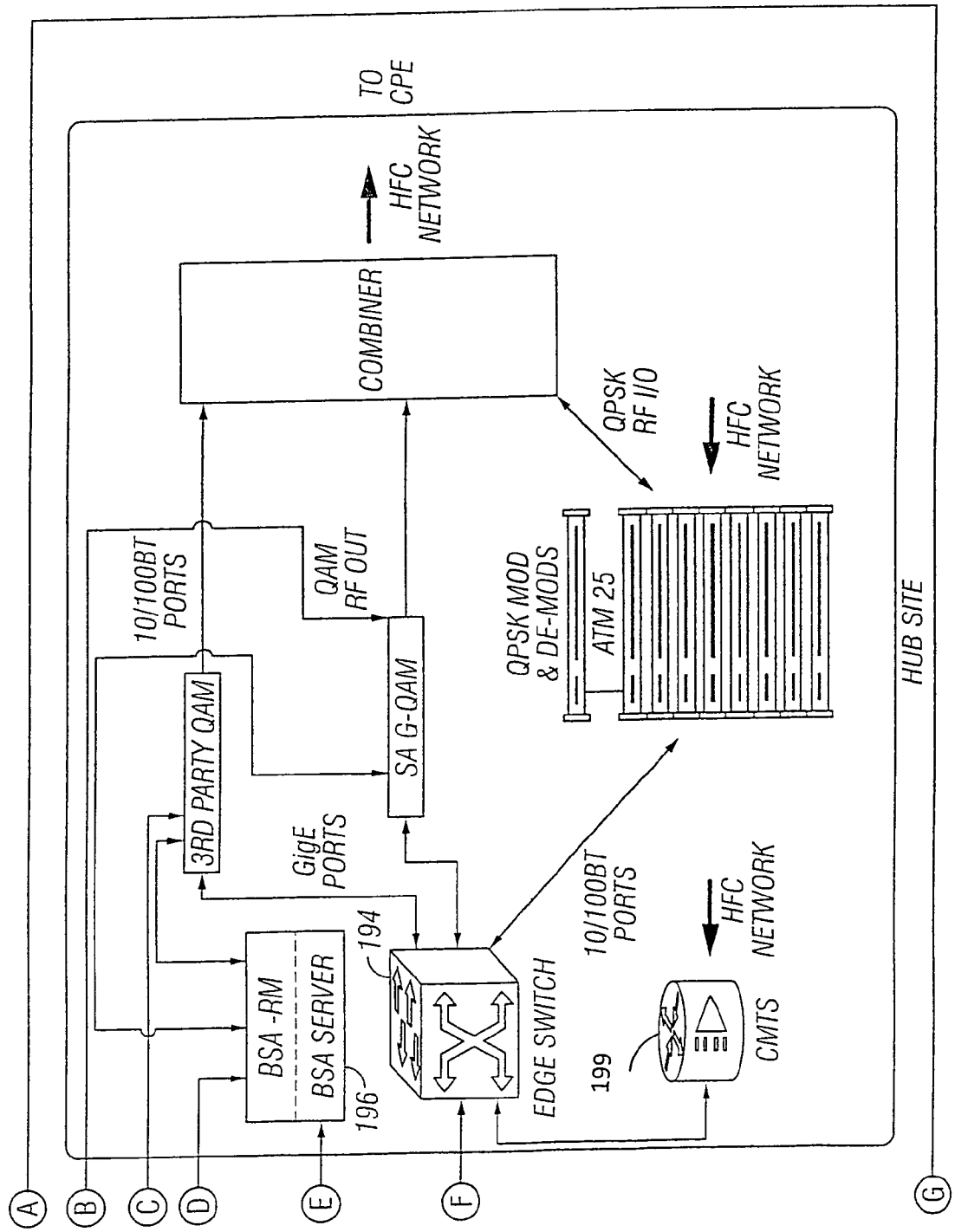

It will also be recognized, however, that the multiplexing operation(s) need not necessarily occur at the head-end 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in co-owned and co-pending U.S. patent applications Ser. No. 11/048,334, entitled "Apparatus and Methods for Multi-Stage Multiplexing in a Network" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1c illustrates an exemplary "switched" network architecture also useful with the audience research features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a* and 1*c* also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Audience Measurement System (AMS)—

Figure 2:
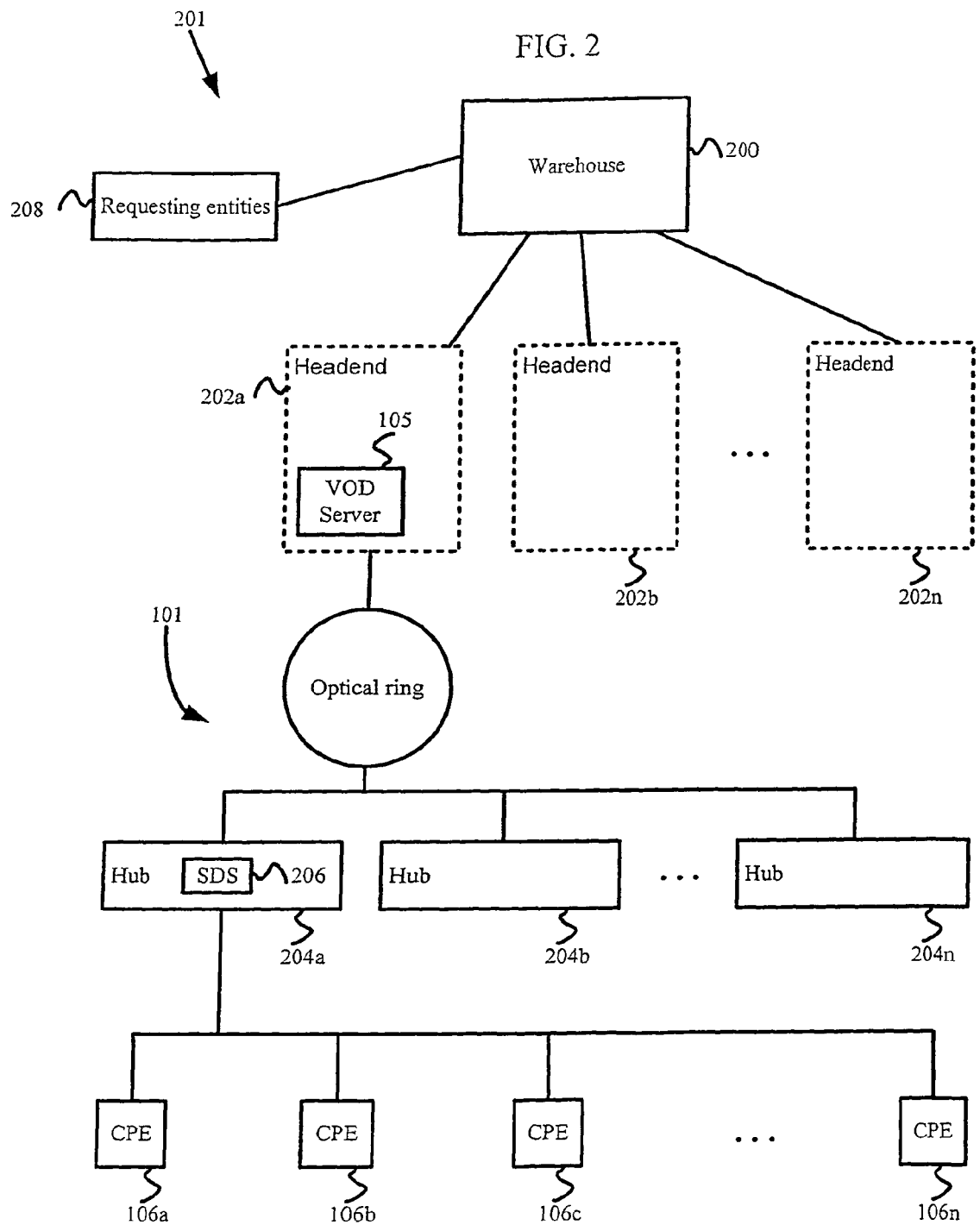
FIG. 2 is a functional block diagram illustrating one exemplary audience measurement system (AMS) in accordance with the present invention.

Referring now to FIG. 2, an exemplary embodiment of the audience measurement system (AMS) 201 according to the present invention is given. The AMS 201 enables sending messages between various entities of the bearer (e.g., HFC) network 101 via one or more network hubs 204. These messages comprise audience research data, which is collected and, in one embodiment, analyzed at a data warehouse 200. The data warehouse may be an MSO-specific entity (e.g., each MSO operating its own warehouse(s)), or alternatively may be a generic or even collaborative entity (e.g., operated by a plurality of different MSOs).

Further, the data warehouse 200 may share an anonymized or otherwise pre-processed version of the audience research data, and/or the raw analyzed data itself, with requesting entities 208 (such as those entities which in the past have relied on Nielsen rating data).

In the present context, the aforementioned audience research data may include any data regarding viewership or user activity/preferences. For example, the audience research data may comprise, inter alia, the size of the audience for any particular program, geographical locations of viewers, and demographic makeup of viewers. Audience research-data may also include data which relates to the utilization of channel tuning or "trick mode" operations (such as stop, fast forward, rewind, etc.) during a program. The data warehouse 200 of the present invention may also be adapted to collect and/or analyze data as belonging to a particular household into a profile (discussed in greater detail below). Requesting entities 208 may then view protected audience research data, with the protection being introduced by e.g., anonymization (or pseudonymization) and asymmetrical encryption or other such methods.

In the illustrated embodiment of FIG. 2, data regarding events occurring at one or more CPE 106 (event records) is sent to the switched digital server (SDS) 206 located at a network hub 204. Data regarding VOD events associated a CPE 106 (VOD event records) is collected by and/or sent to the VOD server 105 and processed into AMDR messages for transmission to the warehouse 200 as well. In one variant, the data may be processed by the CPE 106 to generate AMDR (audience measurement data record) messages which are sent to the SDS 206. Alternatively, data processed by the CPE 106 may be sent directly to the network headend 202 and/or warehouse 200 without the use of a hub 204 or SDS 206. As yet another alternative, "raw" user data may be collected by the hub entity, headend, or warehouse, such as where upstream tuning or LSCP commands are collected and processed within a network entity. AMDR messages may then be generated; e.g., at the SDS 206 or VOD server 105.

The exemplary AMDR messages may include AMDR session establishment messages and AMDR event messages, both of which will be discussed in greater detail below. Generally, AMDR event messages are securely sent in the exemplary AMS 201 as anonymized (or pseudonymized) and asymmetrically encrypted messages. The SDS 206 or other receiving/collecting entity then passes the AMDR messages on to the warehouse 200 for collection and/or analysis. The processing required to generate AMDR messages from collected data is accomplished by one or more applications running on the aforementioned devices and will be discussed in greater detail below.

It is noted that the headend 202 depicted in FIG. 2 may comprise, in one embodiment, headend(s) belonging to various MSOs. Alternatively, the headend 202 may comprise one or several headends 202 of the same MSO. It is further appreciated that in alternative embodiments, the hub 206 entities may be eliminated or not present (e.g., in a non-switched delivery network).

Likewise, in yet another embodiment, each of the headend 202 may comprise an individual mini-warehouse (not shown) for storage or analysis of "local" audience research data; e.g., that pertinent to the subscriber base associated with that headend. According to this embodiment, after a certain period of time, at a particular time of the day, or upon warehouse 200 request, data in the mini-warehouse will be sent to the "global" warehouse 200 (described below), thus reducing traffic to and from the warehouse 200.

Another exemplary embodiment of the AMS 201 is depicted in FIG. 2*a*. As illustrated in this embodiment, data regarding VOD events associated with one or more mobile user devices 214 (such as a mobile phone, handheld PDA, etc.) is collected by and/or sent to the VOD server 105 from which content was received. The event data is then processed to AMDR messages for delivery to the warehouse 200. Content delivered from a VOD server 105 to one or more mobile user devices 214 may occur via the methods and apparatus discussed in co-owned and co-pending U.S. patent application Ser. No. 11/258,229 entitled "Method and Apparatus For On-Demand Content Transmission and Control Over Networks" filed Oct. 24, 2005, incorporated herein by reference in its entirety. The methods and apparatus disclose on-demand content delivery accomplished via a "point-to-point" approach, wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices. Thus, information regarding distribution of content to various mobile user devices 214 as well as other information regarding the user's activities with respect to the content (such as stopping, restarting, fast forwarding, etc.) may be collected at the VOD server 105, via the associated IP gateway 210 and cellular service provider 212, and processed to AMDR messages, which are stored and/or analyzed at the warehouse 200. With a greater and greater amount of data and content "traffic" being sent to or originated from mobile devices, the activities of mobile device users represent an increasingly important segment of the "audience" who might interact with various types of content.

Figure 2B:
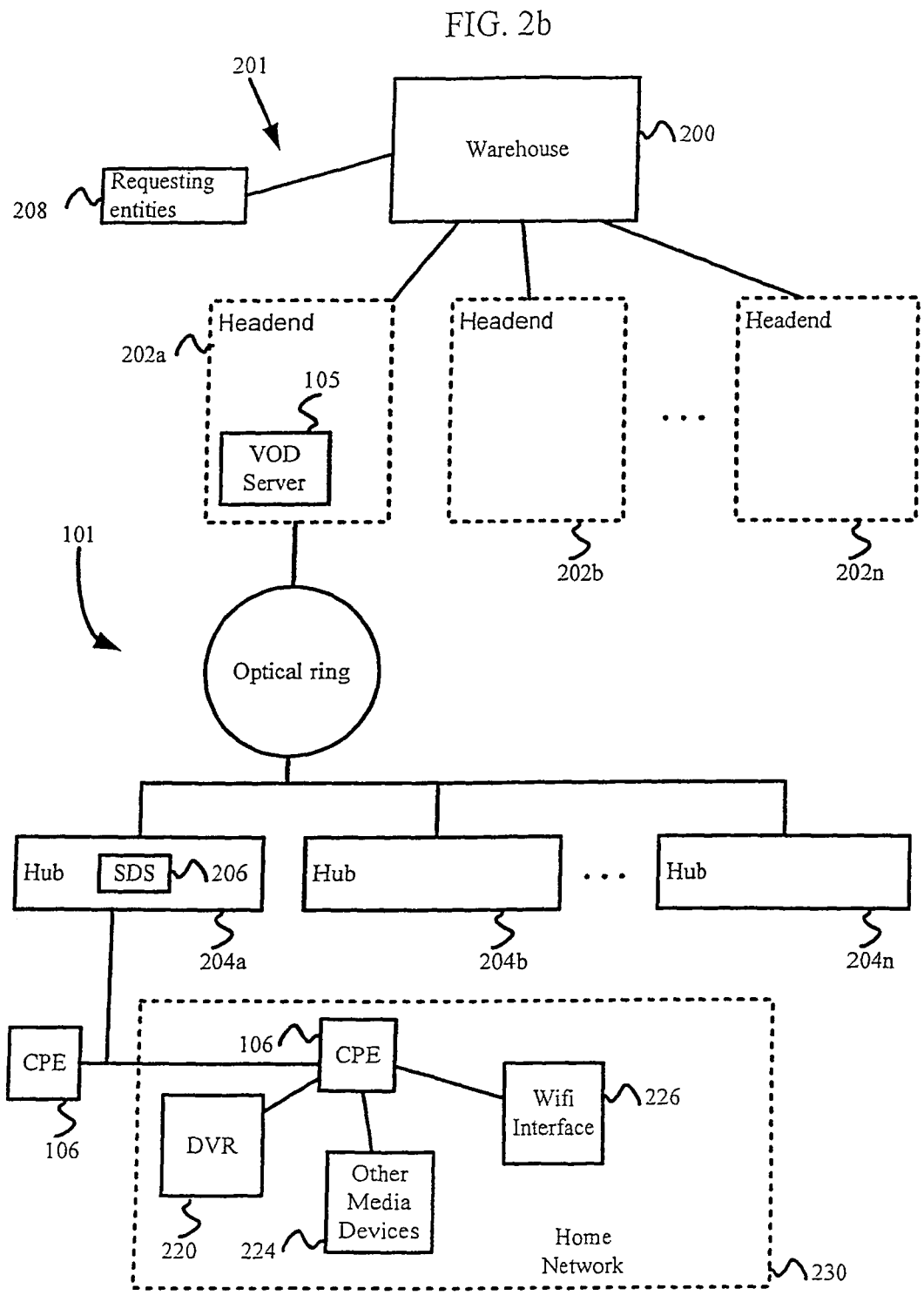
FIG. 2b is a functional block diagram illustrating another exemplary AMS in accordance with the present invention.

FIG. 2b illustrates yet another exemplary embodiment of the AMS 201; it depicts the utilization of a CPE 106 to collect event data and generate AMDR messages regarding events occurring within a home network 230. Exemplary methods and apparatus for the establishment of a home network 230, and the ability of the CPE 106 to share or transfer protected content to devices connected to or communicating with the home network 230, are described in co-pending and co-owned U.S. patent application Ser. No. 11/592,054 filed Dec. 1, 2006 and entitled "Methods and Apparatus for Premises Content Distribution", incorporated herein by reference in its entirety.

Specifically, the foregoing disclosure provides a mechanism for devices connected to a premises network to exchange information, and ultimately share or transfer protected content (including for example audiovisual or multimedia content, applications or data) in a substantially "peer-to-peer" fashion and without resort to a central security server or other such entity. Authorized "browsing" of the content present on one device by another device is also provided. In one exemplary embodiment, application-level message exchange functionality allows the premises devices to advertise their security capabilities relating to, e.g., protected content, and query other devices for their security capabilities. This query can be performed, for example, by identifying security frameworks or security packages that a device is capable of handling.

Accordingly, audience research data may be accumulated and analyzed from any of the devices connected to a home network 230, including, inter alia, a DVR 220, other media devices (such as laptop computers, personal computers, etc.) 224, and devices connected via a WiFi (802.11a,b,g,n) interface 226 and/or a Firewire (e.g., FW400, FW800, etc.) interface, not shown.

It is noted that the CPE 106 discussed above comprise any one of a variety of consumer equipment including, inter alia, a converged premises device, such as for example that described in co-owned and co-pending U.S. patent application Ser. No. 11/378,129 filed Mar. 16, 2006 and entitled "Methods and Apparatus for Centralized Content and Data Delivery", incorporated herein by reference in its entirety.

The AMDR messages utilized in gathering audience research data are transmitted in the above-described embodiments between various AMDR sources and AMDR destinations. The AMDR messages include AMDR session establishment messages and AMDR event messages.

Figures 1, 2C:
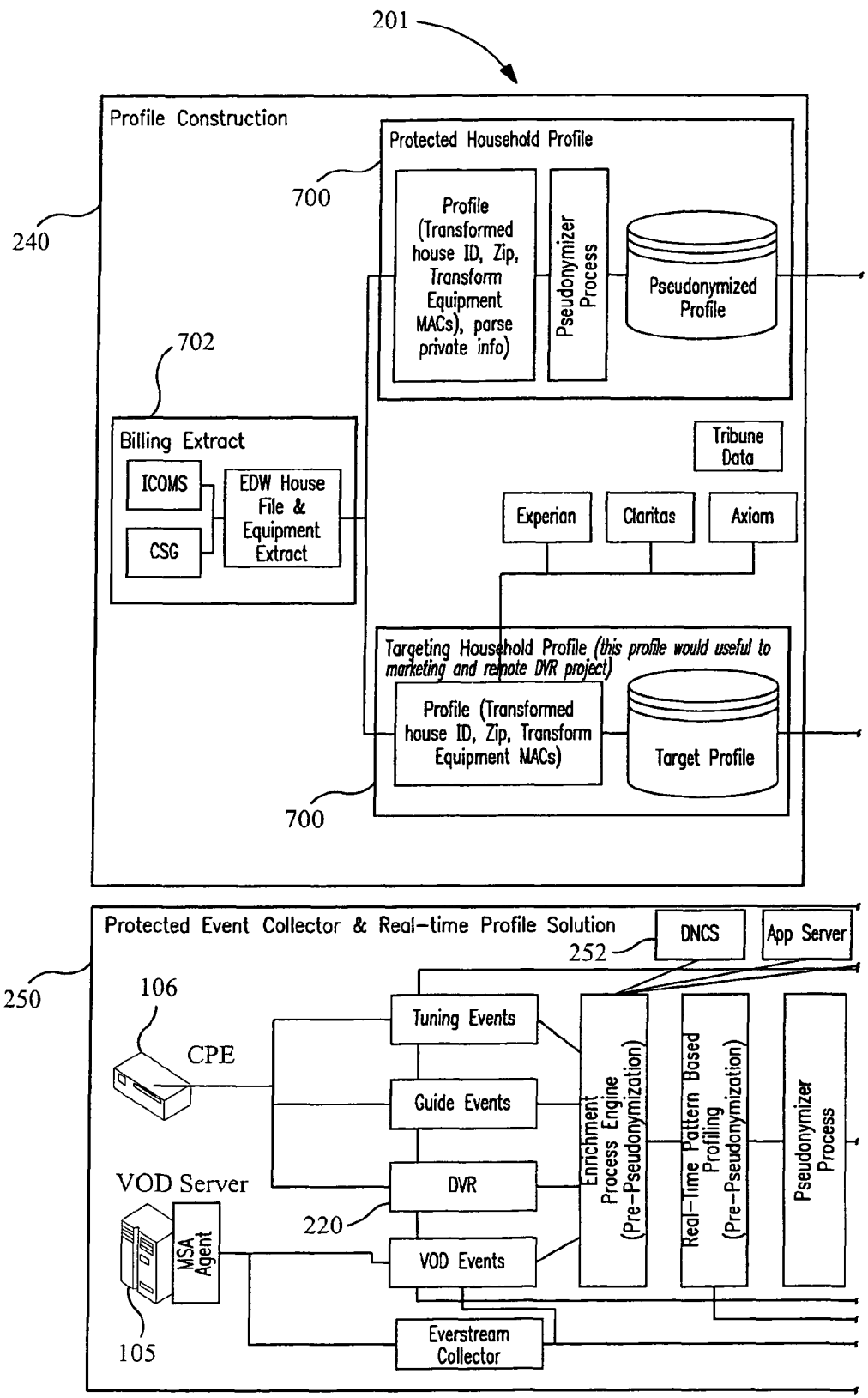
FIG. 2c is a functional diagram illustrating yet another exemplary AMS in accordance with the present invention.
Figures 2, 2C:
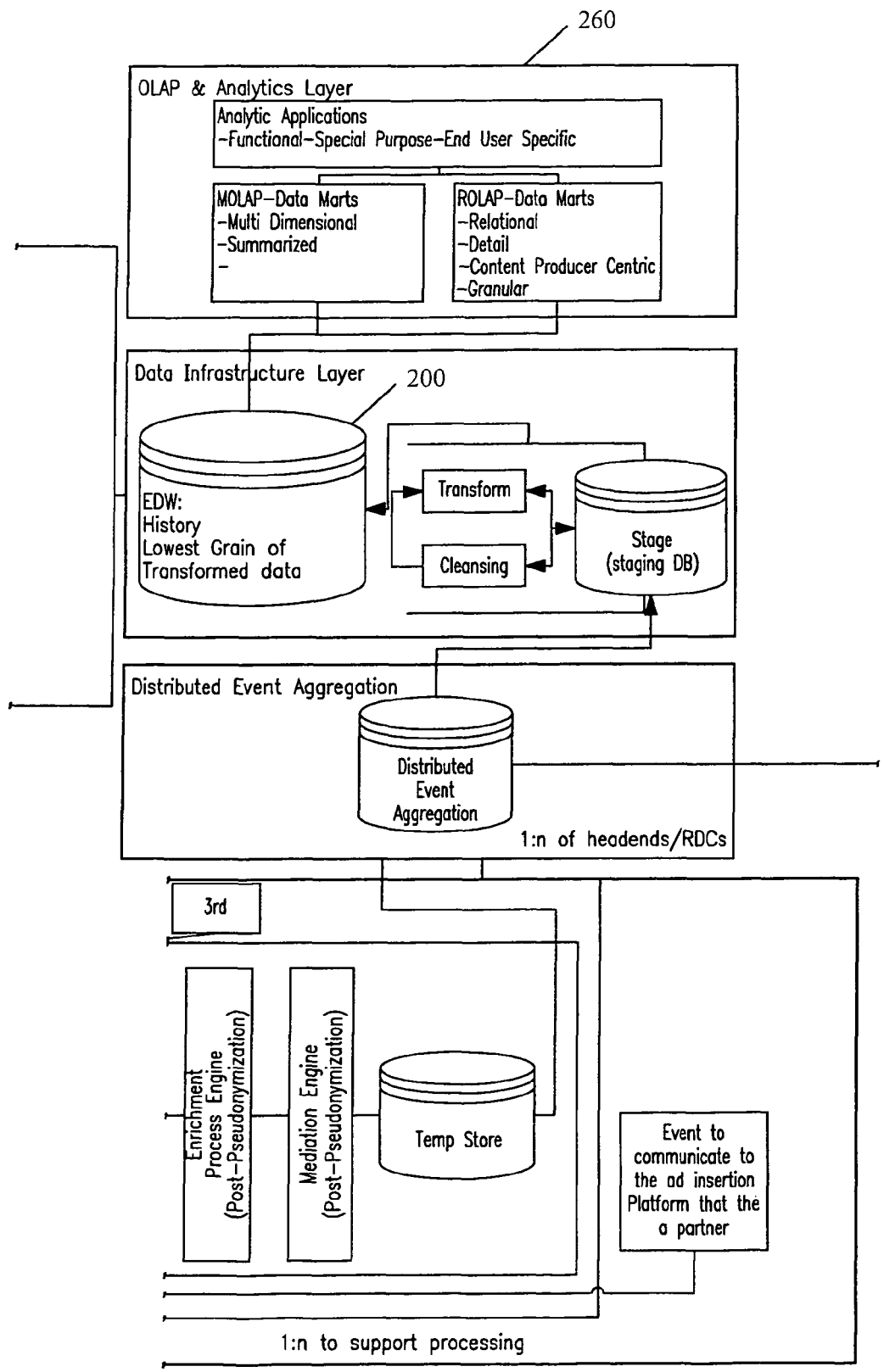

Referring now to FIG. 2c, one exemplary implementation of the AMS 201 within a cable television network is described. As illustrated, the AMS 201 generally comprises a profile construction (software) layer 240, a protected event collection layer 250, an OLAP and analysis layer 260, and a reporting layer 270. The profile construction layer 240, as will be discussed in greater detail below, utilizes a billing extract 702 to produce protected (pseudonymized) and/or unprotected (non-pseudonymized) profiles 700. The event collection layer 250 utilizes various collection entities (such as a CPE 106 and a VOD server 105) to collect data regarding audience viewership occurring at a CPE 106, or at other devices connected thereto (such as a DVR 220). The OLAP and analysis layer 260 is comprised of the data warehouse 200, which is utilized to store and analyze event data (including optionally creating user profiles 700 and performing Nielsen-like analysis of data, discussed below). The OLAP and analysis layer 260 may be adapted to generate standard and ad hoc reports 272 at a reporting layer 270.

Session Establishment and Associated Messages—

Figures 2, 2C, 3:
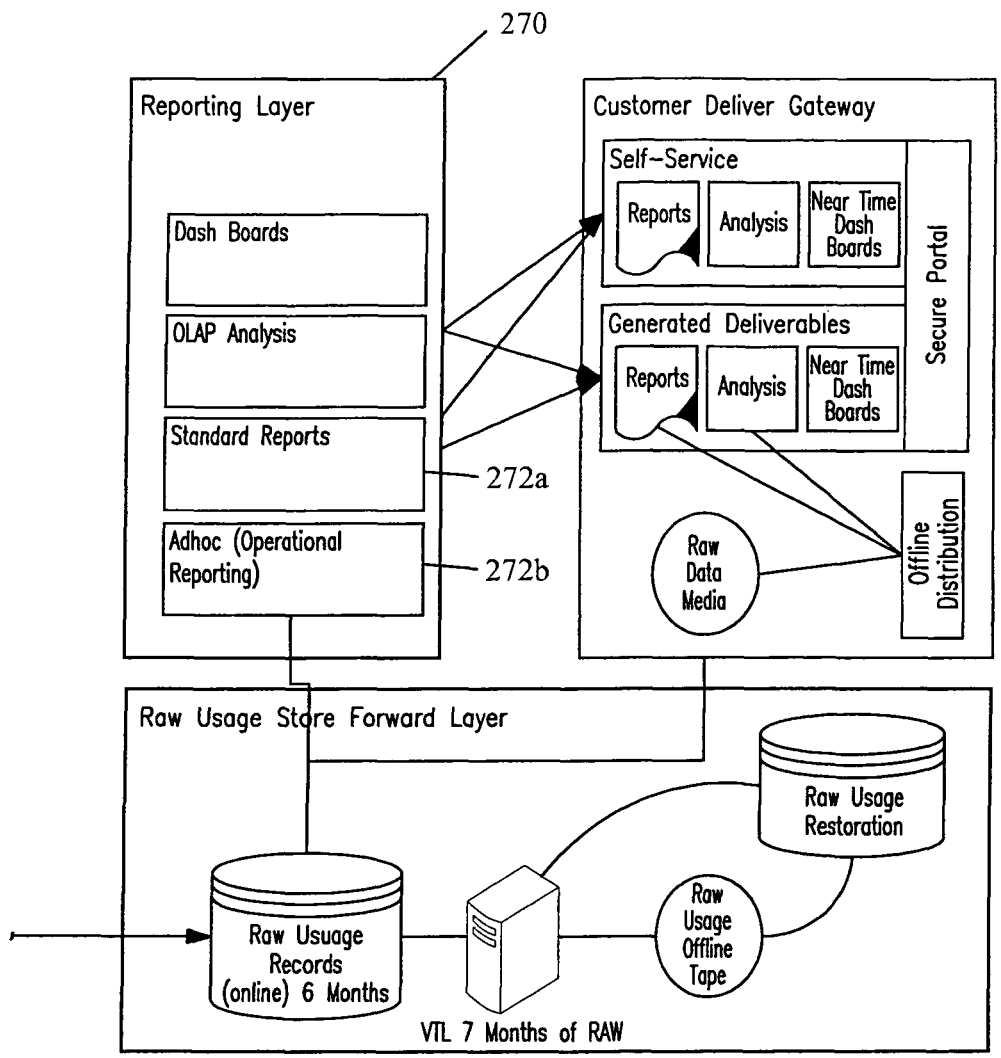
FIG. 3 is a logical flow diagram of an exemplary flow of session establishment messages in the present invention.

FIG. 3 illustrates an exemplary session establishment in an AMS 201 according to one embodiment of the invention. Although given in terms of a specific series of titled messages, it is appreciated that alternate message titles and/or an alternate series of messages may be utilized to facilitate the same or similar message exchanges described herein.

AMDR session establishment generally comprises a series of messages sent between a first entity, which is termed an AMDR source 302, and a second entity, which is termed an AMDR destination 304. The source 302 may comprise a collecting entity, which is any network entity adapted to keep records of audience research information. Such entities may include, inter alia, a CPE 106, a VOD server 105, an SDS 206, etc. The destination 304 may comprise the data warehouse 200. Alternatively, the destination 304 may comprise an intermediary between the source 302 and its final destination (e.g., warehouse 200), such as a hub 204. In this instance, the hub 204 will serve first as a destination 304 (when it receives the message), and then will act as a source 302 when it sends the message to another entity (either another intermediary or the warehouse 200, or even a third party destination or network entity such as a web server).

As depicted in the exemplary exchange protocol of FIG. 3a, in order for a session to be established between the first and second entities, the collecting entity first registers as a source 302 to the destination 304 entity; thus, a Source Registration 306 message is sent from the source 302 to the destination 304. The destination 304 will then respond via a Source Register Response 308 message.

AMDR session establishment in the illustrated embodiment further comprises a mechanism for ensuring that the source 302 and destination 304 have the same network ID map. The network ID map comprises in this embodiment a "look-up" table of program channel call letters (e.g., HBO, CNN, MTV, CBS, NBC, etc.) mapped to a network ID with which the destination 304 associates each. For example, the program channel HBO may have the network ID 60032, and the program channel CNN may have the network ID 60854. It will be appreciated by those of ordinary skill, however, that other data structures or approaches may be used besides or in addition to the aforementioned look-up table; e.g., relational databases or the like. One important reason for use of this network ID negotiation in the illustrated embodiment is to ensure that, if the same content source or provider (e.g., HBO) is named differently in two different divisions or headends (such as for example HBO and HBOe, respectively), the network ID mapping allows for use of a common network ID so that the warehouse knows that the programming is the same even though the naming is different.

To facilitate the above-described network ID confirmation, first, a Get Network ID Map 310 message is sent to the destination 304. The destination 304 responds with a Get Network ID Map Acknowledgement 312 message; and subsequently a Send Network ID Map 314 message including the network ID map. The source 302 acknowledges the arrival of the map by sending a Send Network ID Map Response 316 message.

The source 302 then examines the call letters listed on the network ID map, and matches them to call letters in the sources' 302 program lists. In one variant, if all of the sources' 302 program call letters match to call letters in the network ID map, the source 302 optionally informs the destination 304 (not shown), although this is not a requirement (i.e., the exemplary embodiments do not require such notification). If, however, one or more source 302 call letters are not listed in the network ID map, the source 302 can optionally generate a list and inform the destination 304 via a No Network ID for Call Letters 318 message, including the list of call letters for which no network ID exists. The destination 304 acknowledges the message (if sent) by sending a No Network ID for Call Letters Acknowledgement 320, and the destination 304 subsequently assigns a network ID for the call letters not previously listed in the form of a Proc Network ID for Call Letters 322 message. The destination 304 further informs an administrator (not shown) of the addition to the network ID map. The message is responded to by the source 302 via a Proc Network ID for Call Letters Response 324 message.

It will be appreciated that the foregoing process of network ID matching is, in the exemplary embodiment, also utilized on a continuous, substantially continuous, or even periodic basis, not just during network ID negotiation as a part of the registration process. For example, if a network/headend technician adds a new network (program source), then the AMS will recognize this addition (e.g., the first time a tuning event is received for that new network), and attempt to find a network ID. If the network ID cannot be found, the aforementioned process is invoked.

Events and Associated Messages—

As noted above, AMDR messages may include session establishment messages and event messages. An AMDR event message may comprise for example a logistical, configuration, and/or tuning event message. Logistical event messages relate primarily to ensuring connectivity and include one or more heartbeat and acknowledgement events. Configuration event messages communicate to the central data warehouse 200 configuration aspects regarding the AMDR source and/or the CPE 106, user, or household to which the event relates. As configuration information changes, configuration messages relay the changes to the warehouse 200. Configuration event messages, in one embodiment (described below), are sent simultaneously with tuning events. Configuration information may include, inter alia, services, channel maps, SDV Servers, etc. Tuning event messages are demonstrative of audience measurement information which is sent from a collecting entity (e.g., CPE 106, VOD server(s) 105, SDS 206, etc.), and communicates real-time tuning activity.

Figure 4A:
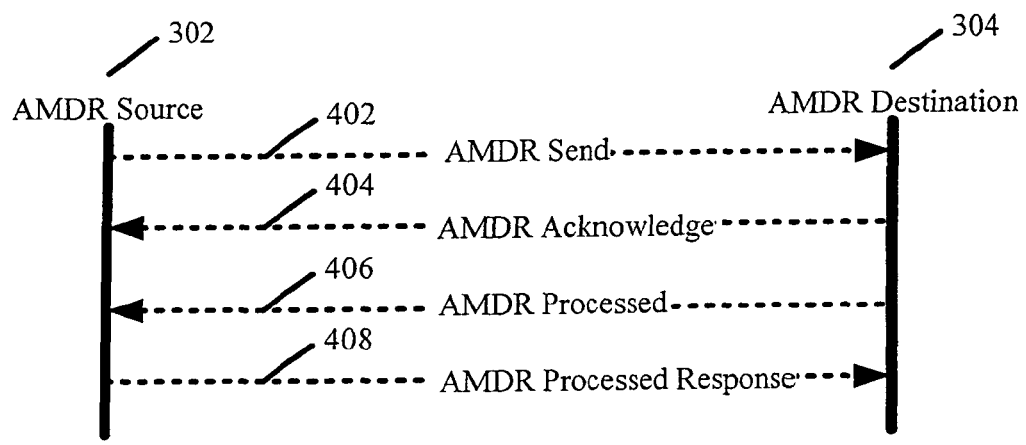
FIG. 4a is a logical flow diagram of an exemplary flow of tuning and configuration event messages during dialoging of a source and destination in the present invention.
Figure 4B:
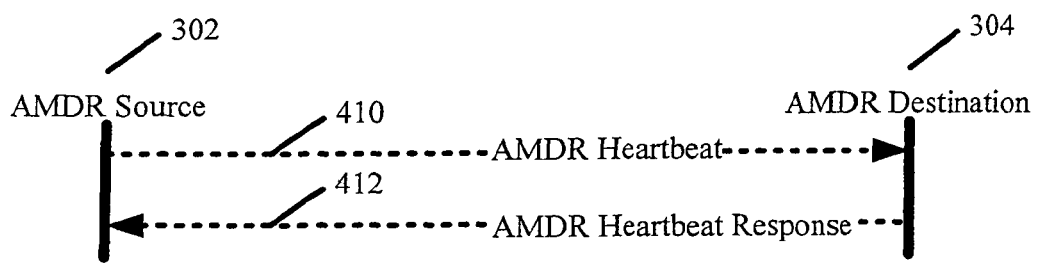
FIG. 4b is a logical flow diagram of an exemplary flow of logistical event messages between a source and destination useful in detecting AMS failures in the present invention.

FIGS. 4a-4b demonstrate exemplary event message exchanges in one configuration of the AMS 201. Although illustrated as a series of messages having particular titles, etc., it is appreciated that alternate message titles, formats, and/or an alternate series may be utilized to facilitate the same or similar message exchanges described herein.

FIG. 4a illustrates an exemplary event message exchange for configuration and tuning events whether sent separately or simultaneously (as discussed below). As illustrated, the source 302 sends a Send 402 message to the destination 304; the Send message 402 includes an "AMDR event message" which contains event-related data. The generation and contents of an "AMDR event message" will be discussed in greater detail below. The destination 304 acknowledges receipt of the message by returning an Acknowledge 404 message. Once the data in the original message is stored and/or analyzed, the destination 304 returns a Processed 406 message, to which the source 302 responds with a Processed Response 408 message.

FIG. 4b illustrates an exemplary event message exchange for logistical events. As noted above, the logistical event message exchange is utilized in the present invention to, inter alia, ensure that all or portions of the AMS 201 is/are functioning properly. At instances where there are no configuration and/or tuning messages being sent, a "heartbeat" may be used to indicate to the AMS 201 that the source 302 is still functioning properly, and that the lapse in event messages is purposeful and not indicative of a connectivity or other type of failure. It is appreciated that in one embodiment, "heartbeat" messages may be sent at a set time-interval from the last event message sent. In other words, the system may be adapted to send a "heartbeat" a certain amount of time (e.g., five minutes after the last event message has been sent—the last event message may include a previous "heartbeat"). Alternatively, "heartbeat" messages may be sent at predetermined time intervals (e.g., every 5 minutes, etc.) In the embodiment of FIG. 4b, the source 302 sends a Heartbeat 410 message to which the destination responds with a Heartbeat Response 412 message. If no response is detected or if a "heartbeat" is not sent according to the pre-set interval, a failure message is generated and sent to the administrator (not shown).

Event Collection and Event Message Generation—

In the exemplary embodiment of the AMS 201 given above, data regarding certain events is collected by various entities. For example, a user's CPE 106 may collect data regarding a viewer's activities with regard to various broadcast programs. Alternatively, a hub 204 entity, such as an SDS 206, may be utilized to collect viewing information regarding broadcast programs. In another variant, the CPE 106 may collect data regarding a viewer's activities with regard to recorded programs (on an associated DVR 204) and may collect viewing information about activities taken on other entities within the CPE's 106 home network 230. Likewise, a VOD server(s) 105 or other servers (such as, inter alia, Pay-per-View servers, Start Over servers, etc.), may also collect data regarding a viewer's activities.

The events about which data is collected generally include, inter alia, tuning events (such as viewing a broadcast program or purchasing a VOD program), manipulation events (such as fast forwarding, rewinding, etc.), recording events, events which relate to changes in the system's configuration; for example, changes to the program channel map or changes to the services a particular CPE 106 receives, and/or "heartbeat" events.

The above described event data is collected into various data records which may then optionally be encrypted for security if desired. Next, the event records are sent as AMDR event messages to a data warehouse 200 (via the network 101) for storage and/or analysis.

Figure 5:
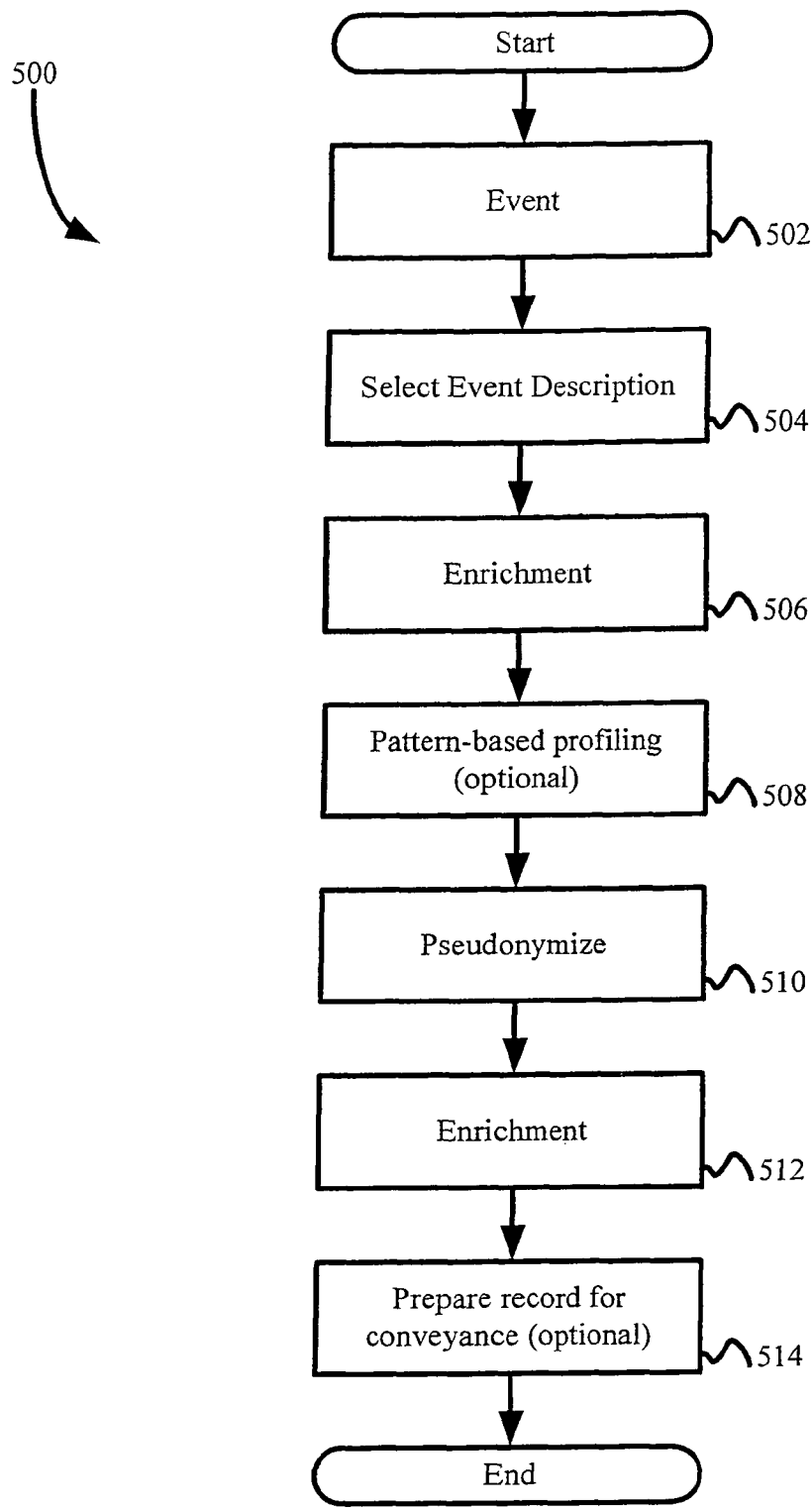
FIG. 5 is a logical flow diagram illustrating one exemplary method of generating record of a user event according to the present invention.

Referring now to FIG. 5, an exemplary method 500 of generating an AMDR event message is given. In one embodiment, AMDR event messages are generated at the collecting entities (CPE 106, VOD server(s) 105, SDS 206, etc.). Alternatively, the AMDR event messages may be generated at an entity separate from the collecting entities and in data communication therewith; the AMDR event message generating entity may be located at the headend, hub or may be inter alia, consumer premises-based.

When a triggering event occurs, the generation of an AMDR event message is initiated. As noted above, the event may comprise a tuning event, such as a viewer tuning to a presently broadcast program, tuning to a program which has already begun and utilizing a start-over approach (e.g., the StartOver mode), tuning to a user's DVR to view recorded programs, tuning to a Pay-per-View program, tuning to a VOD program, utilizing trick mode operations, etc. Alternatively, the event may comprise a "heartbeat" event wherein the system sends periodic messages back and forth to ensure proper functioning of the equipment and/or data exchange process. Events regarding changes to the configuration (e.g., a software upgrade) of the system may also trigger the generation of an AMDR event message. It is appreciated that information regarding any of the aforementioned triggering events may be included in a single AMDR event message or may be sent as separate AMDR event messages.

If the triggering event is a VOD event, it is associated with a "tuning event" (e.g., such as those originating at the user's CPE 106) by utilizing the MAC address of the CPE on which the VOD event occurred combined with the timing of the event.

Per step 502, information is gathered, in the form of an event record, containing at least one event description. For example, if the event comprises the user tuning to a particular channel, the event description will describe that a channel was tuned to, and give identifying information about the channel tuned to, etc.

At step 504, the event description is selected.

Then, at step 506, the event record is "enriched" by the insertion of associated data elements. In other words, processing is performed and/or additional data is added so as to enhance or increase the value of the data. For instance, in one embodiment, event information is coupled to user specific information. It is at this step where, in the illustrated embodiment, data from the Digital Network Control System (DNCS) 252 which requires the CPE's 106 native MAC address is correlated to the record. Such data features information regarding a CPE's 106 particular configuration including, inter alia, the specific services a CPE 106 is associated with, what a CPE 106 is authorized to tune to, etc. If changes are made to this data, these changes will be reported to the DNCS 252 and subsequently associated with the CPE 106 (via its MAC address). Data derivation at the DNCS 252 is well known to those of ordinary skill in the art, and thus will not be discussed in further detail herein.

It is appreciated that at this point, optional pattern-based profiling may be performed, at step 508. Pattern-based profiling utilizes in one variant a computer application to examine event patterns and determine a behavioral profile associated with a designed CPE 106. Such profile may be stored, as discussed below, and used to drive real-time action into the network 101(such as, e.g. real-time ad insertion, etc.) The insertion of content based on the profiling performed at this step is optional in nature, in that a user must "opt in" to having information about their viewing patterns or other activities monitored. This facet will be discussed in greater detail below.

In one embodiment, primary and/or secondary content may be inserted and/or recommended to a user based on information gathered and patterns observed at the above-mentioned profiling step. Exemplary methods of this targeted content insertion and/or recommendation will be described below.

Pseudonymization of the event record generated thus far occurs next, per step 510. The process of pseudonymization ensures secure and anonymous exchange of data in the AMS 201 by using a hash function and, in one embodiment, further incorporating asymmetric encryption to generate an encrypted and sendable event record referred to herein as an AMDR event message. These and other methods of ensuring anonymity in the AMS 201 will be described below.

At step 512, the pseudonymized record, also termed an "AMDR event message", is enriched a second time. This level of enrichment involves association of data elements from the DNCS 252 which do not require the CPE's 106 native MAC address. Such association data elements include, inter alia, channel maps, data utilized to convert a station name to programming name, identification of a tuning event, etc.

It is noted that at this point, at step 514, the AMDR event message may be optionally prepared for conveyance. Preparation of the record for conveyance may include filtering, validating, aggregating, correlating, distributing, and/or transforming the data by a mediation engine. In one embodiment, the mediation engine is co-located on the data collecting entity (CPE 106, VOD server(s) 105, SDS 206, etc.); alternatively, the mediation engine may comprise a standalone entity disposed at the headend 202, a hub 204, or at a consumer's premises. Subsequent to the final enrichment 512 and/or preparation, the AMDR event message may be optionally temporarily stored prior to being sent on to a data warehouse 200. Such storage may occur at a local warehouse (not shown) or within the CPE itself.

AMDR Configuration—

As noted above, an AMDR event message is an enhanced and pseudonymized event record demonstrative of audience measurement information which is sent from a collecting entity (e.g., CPE 106, VOD server(s) 105, SDS 206, etc.), which is the initial AMDR source, to an AMDR destination (e.g., a data warehouse 200, mini-warehouse, or third-party entity). As noted above, the initial AMDR source may send an AMDR to a first AMDR destination which may then act as an AMDR source for sending the data to a second AMDR destination, and so forth; such as, for example, when one or more hubs 204 are utilized.

Figure 6:
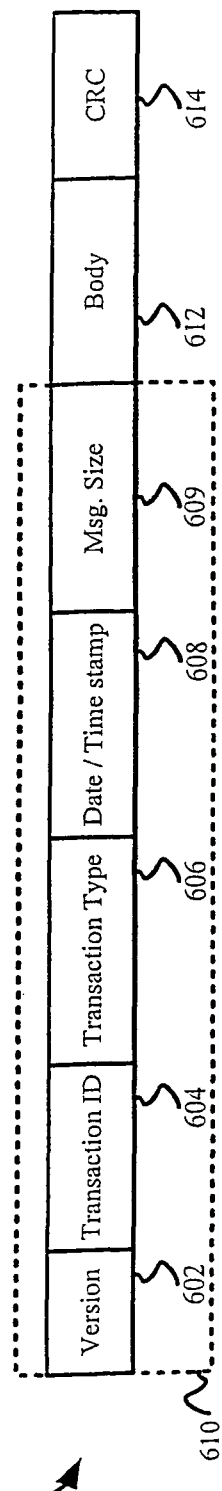
FIG. 6 is a functional block diagram of an exemplary audience measurement data record (AMDR) for use in the present invention.

In one embodiment, the AMDR event messages are generally configured as demonstrated in FIG. 6. As illustrated, an exemplary AMDR event message 600 consists of a header 610, a body 612, and a cyclic redundancy check (CRC) 614 of the type well known in the art (e.g., Reed-Solomon), regardless of the event the AMDR event message 600 is descriptive of. Alternative configurations or formats are also useful in the present invention. For example, additional or other error correction techniques, message formats, etc. may be used.

The header 610 portion of the AMDR event message 600 is comprised of a version element 602, a transaction ID 604, a transaction type 606, a date/time stamp 608, and a message size 609.

The version element 602 of the header 610 indicates which version of the AMDR event message configuration is utilized. It is appreciated that several versions of AMDR event messages 600 may be generated each one being slightly different from the next, and each being described in an associated version of a description or specification. For example, in one embodiment, the AMDR event messages of the present invention are of the type described in entitled "*Audience Measurement Data Record Specification—Draft*" Version 2.2 dated Mar. 27, 2008 which is incorporated herein by reference in its entirety. Thus, the particular version of an event message utilized to generate the given event message 600 must be placed within the message 600 itself, so that the receiving entity is aware of the details of the message's configuration (given by the specification version).

The transaction ID 604 is a numerical identifier which is attached to each message 600. In one embodiment, each time a specific dialog is started (consisting of a plurality of individual messages 600), a unique Transaction ID 604 is assigned so that each message 600 of the dialog can be tracked. Alternatively, messages 600 generated from a particular AMDR source may have similar or identical transaction IDs 604. In another alternative, a unique transaction ID 604 may be generated for each AMDR event message 600 sent and received.

The transaction type 606 is an indicator of what type of message will follow in the body 612. Table 1 presented below gives some exemplary transaction types 606; however, other transaction types 606 may be utilized as well.

TABLE 1

| Transaction Type | |
|---|---|
| AMDR Source Register | 0x00 |
| AMDR Source Register Response | 0x01 |
| AMDR Source Unregister | 0x02 |
| AMDR Source Unregister Response | 0x03 |
| AMDR Get Network ID Map | 0x10 |
| AMDR Get Network ID Map Acknowledge | 0x11 |
| AMDR Send Network ID Map | 0x12 |
| AMDR Send Network ID Map Response | 0x13 |
| AMDR No Network ID for Call Letters | 0x14 |
| AMDR No Network ID for Call Letters Acknowledge | 0x15 |
| AMDR Proc Network ID for Call Letters | 0x16 |
| AMDR Proc Network ID for Call Letters Response | 0x17 |
| AMDR Send | 0x20 |
| AMDR Acknowledge | 0x21 |
| AMDR Processed | 0x22 |
| AMDR Processed Response | 0x23 |
| AMDR Heartbeat | 0x30 |
| AMDR Heartbeat Acknowledge | 0x31 |

The transaction type 606 will vary based upon the contents of the message 600 in the body 612 (discussed below). For example, if the body 612 is descriptive of a heartbeat event, the transaction type 606 will be listed as an AMDR Heartbeat. The transaction type 606 listed in the header 610 gives the destination 304 notification as to what type of information will be contained in the body 612 that follows.

Data regarding a viewer's tuning to a particular channel may not be informative of what program the viewer viewed; supplemental data regarding at what time and on what date the viewer tuned thereto is necessary to understand the tuning data in context. Accordingly, a date/time stamp 608 is incorporated into an exemplary AMDR event message 600. The date/time stamp 608 is useful to ensure that the audience research data contained therein is correlated to the appropriate date and time to which it refers and gives a context for the events described. The date/time stamp 608 gives the AMS 201 useful information which is translated to user profile information. The profile may be segmented across different parts of a week (e.g., weekdays, weekends) as well as across different parts of a day (e.g., morning, afternoon, evening, primetime, late night, etc.)

A message size field 609 is also included within the AMDR event message. This field allows inter alia systems interpreting the AMDRs to more efficiently extract AMDRs from their communication medium (e.g., based on size filtration), and may also be utilized for more efficient network operation such as via size-based flow control algorithms.

The events an AMDR event message 600 describes will be indicated by the body 612. Thus, the body 612 portion of the AMDR event message 600 will be unique for a tuning event, a recording event, a heartbeat event, and so forth. For example, the body 612 of an AMDR event message 600 describing a tuning event may contain a program channel number and/or program description (such as title, etc.) as well as information regarding the use of trick functions. The body 612 of a recording event may contain information regarding the channel, program description, the date/time the program is displayed, trick mode operations etc.

In one embodiment, configuration event data is placed in a tuning and/or recording event record at the enrichment steps (504, 508) discussed above. Alternatively, changes to configuration may comprise "events" which trigger the generation of an event record and subsequently, an AMDR event message 600. Thus, according to this embodiment, the body 612 may be representative of a configuration event as well.

The CRC 614 portion of The AMDR event message. 600 is a fixed size output of a function that is adapted to take an input of data (of any length) and produce a corresponding output at a fixed size. The CRC 614 is utilized as a mechanism to ensure the integrity of data during transmission and/or storage. The CRC 614 is particularly adapted to assist in the detection of transmission and other common errors. Exemplary CRC 614 useful in the present invention, as well as exemplary methods of use thereof is described in the publication entitled "*Cyclic Codes for Error Detection*" published in Volume 49, Issue 1, January 1961 Page(s):228-235 in the Proceedings of the Institute of Radio Engineers (IRE) by Peterson, et al., which is incorporated herein by reference in its entirety. CRCs 614 and their use are well known in the art and thus will not be discussed in further detail herein.

Profile Construction—

As noted previously, in one exemplary embodiment, the AMS 201 of the present invention is adapted to construct and store audience research data as one or more user profiles relating to one or more CPE 106. In one embodiment, more than one profile is utilized per user or per CPE 106; these profiles being segmented by part of a week (such as weekend, weekday, etc.), part of a day (such as morning, afternoon, primetime, etc.). In another variant, more than one profile may be created to be representative of the more than one user, or the more than one CPE 106 in household.

In another embodiment, the event messages 600 may be linked, via SID (salted hashed Customer ID/Division ID), to one or more CPE 106 (or other device) belonging to a single household. Accordingly, every event occurring at various CPE 106 and/or other devices associated with a particular household would be cumulated into one overarching household profile. In other words, the AMS 201 would "know" that one or more devices (e.g., CPE 106, DVR 220, etc.) and/or one or more events (e.g., tuning events, VOD events, etc.) belong to users in the same household or premises.

As noted above, the profiles may be used to gather audience research data on a patterned basis. The data may be shared with requesting entities 208 for gathering statistical information and therefore must utilize adequate security measures to maintain the anonymity of individual users associated with the profiles.

Further, a user's profile (or household/premises profile) may be utilized for the insertion and/or recommendation of targeted content, such utilization permitting or even requiring a non-protected version of the profile.

Figure 7:
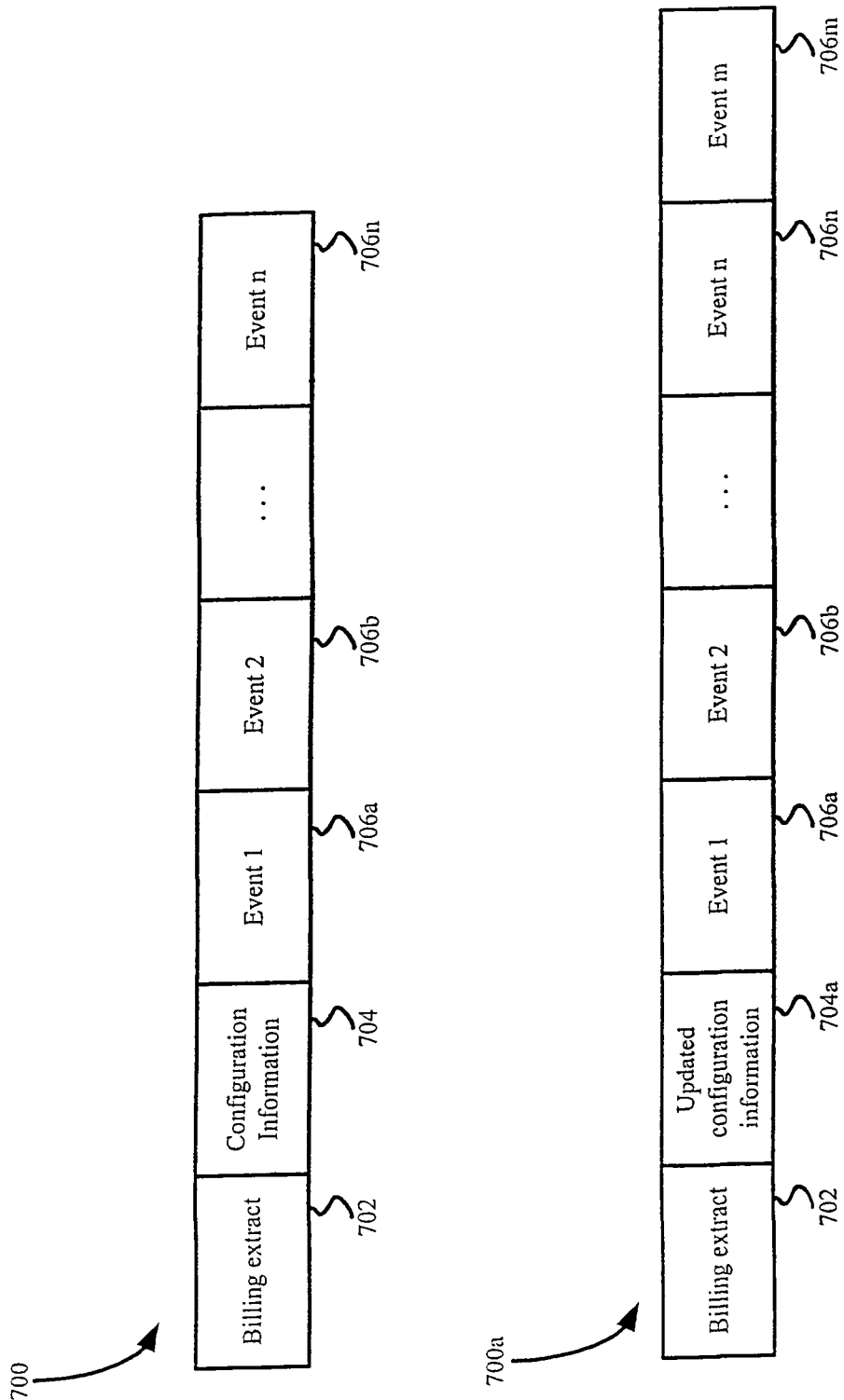
FIG. 7 is a functional block diagram of an exemplary user profile, and an exemplary updated user profile in accordance with the present invention.

Referring now to FIG. 7 an exemplary user profile 700 is illustrated. In one embodiment, one or more profiles are generated and/or maintained at the CPE 106 to which they associate; alternatively, profiles may be generated and/or stored at a hub 204, a headend 202, or at the data warehouse 200. It is further appreciated that multiple copies of a profile (whether protected or unprotected) may be generated and/or stored at any of the aforementioned entities. As depicted in FIG. 7, the exemplary user profile 700 generally comprises relevant non-PII data obtained from a billing extract 702, relevant configuration information 704, and any number n of events 706.

The billing extract 702 is a compilation of information received from various third party billing systems (including, for example, ICOMS and CSG). The data information obtained from third party billing systems includes, inter alia, current plan and/or rate, services associated with the CPE 106 (or a user, or a household) to which the profile belongs, etc. The billing extract 702 is produced once per day (e.g., nightly) after it has been seeded with relevant information once.

The configuration information 704 comprises information regarding the CPE 106 and system configuration. Such information includes, inter alia, services, channel maps, information regarding SDV servers, etc. The configuration information 704 is updated when changes to the configuration occur. As discussed above, when configuration changes take place a separate AMDR event message 600 may be sent or, alternatively, the changes may be incorporated into an event message 600 regarding a tuning event, a heartbeat event, etc.

The user profile 700 events 706 comprise pieces of information that are pulled from the body 612 of the event messages 600 received. In other words, the profile generating entity (i.e., the CPE 106, hub 204, headend 202, warehouse 200, etc.) clips a portion of the body 612 of an event message 600 describing an event and places the information into the chain of events (706a, 706b . . . 706n) of the user profile 700 to which it is associated.

FIG. 7 further demonstrates an exemplary embodiment of an updated user profile 700a. As discussed above, a profile 700 is renewed or refreshed (to an updated profile 700a) by the incorporation of configuration changes to the previous configuration information 704, resulting in updated configuration information 704a. A profile 700 is also renewed or refreshed (to an updated profile 700a) by the incorporation new events 706m to the chain of events currently accounted for (706a, 706b . . . 706n). The updating of configuration information 704 and events 706 may occur simultaneously, or may occur at separate operational steps. Further, it is noted that each event message 600 may not necessarily be accompanied by changes to the configuration information 704.

As noted above, a user profile 700 once generated may be distributed to requesting entities 208 for statistical purposes. Accordingly, one or more mechanisms for ensuring the anonymity of the users to which AMDRs associated with these profiles 700 relate are needed and will be discussed below.

It is also appreciated that, in certain instances, a user will be given an option to have an unprotected profile 700 generated and maintained. The unprotected profile 700 will be securely maintained, however, the unprotected profile will be utilized in conjunction with the below described mechanisms for targeted content insertion and/or recommendation. Accordingly, a user may affirmatively give the system permission to create and maintain an unprotected copy of the user's one or more profiles. In one variant of the invention, pseudonymization of each AMDR is performed, yet the profile is not pseudonymized. Those AMDRs destined for an "unprotected profile" have additional elements in the body portion of the AMDR that include user-related information (e.g., contact information).

Profile Generation and Updating—

Figure 8:
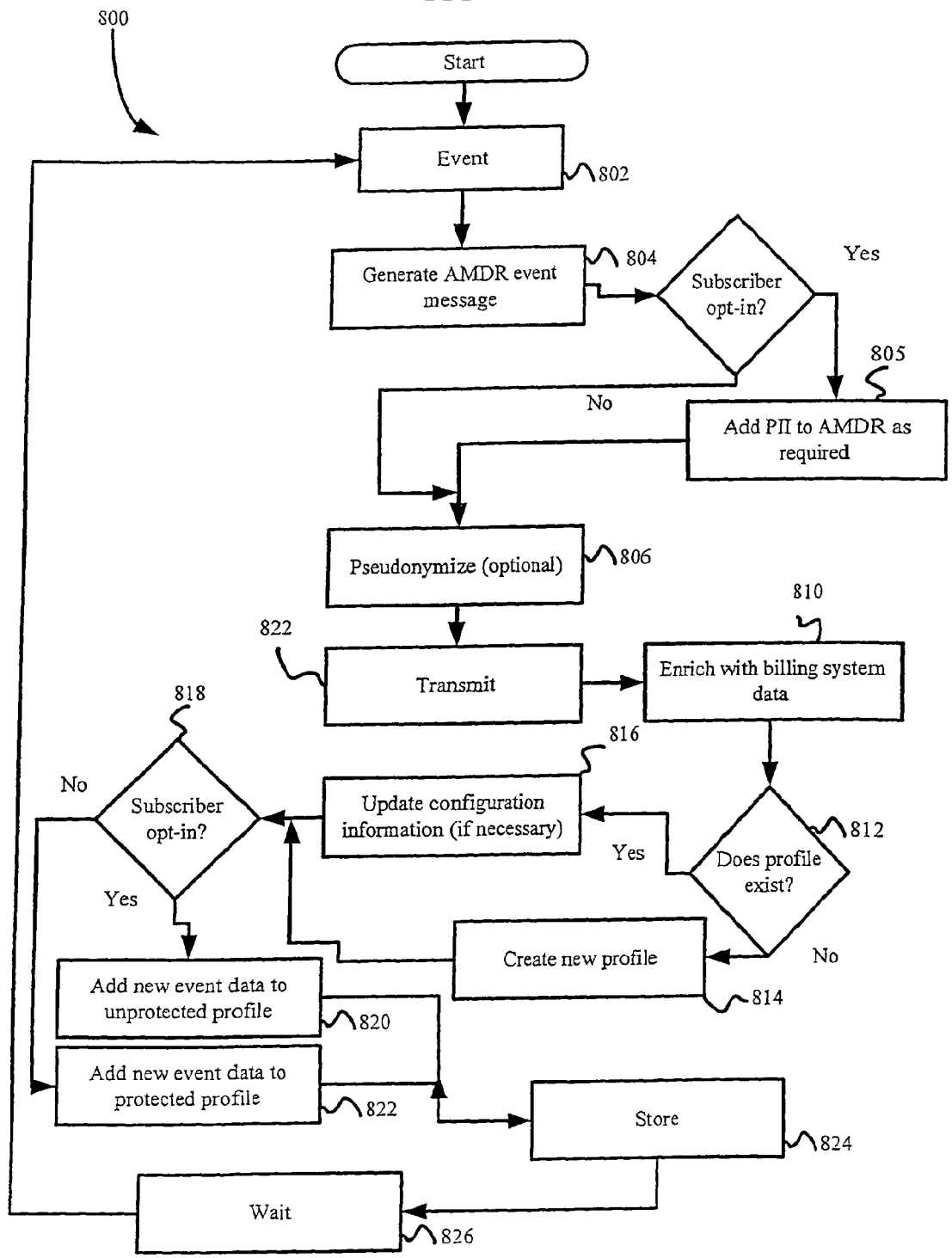
FIG. 8 is a logical flow diagram illustrating one exemplary method of generating and updating a user profile according to the present invention.
Figure 9:
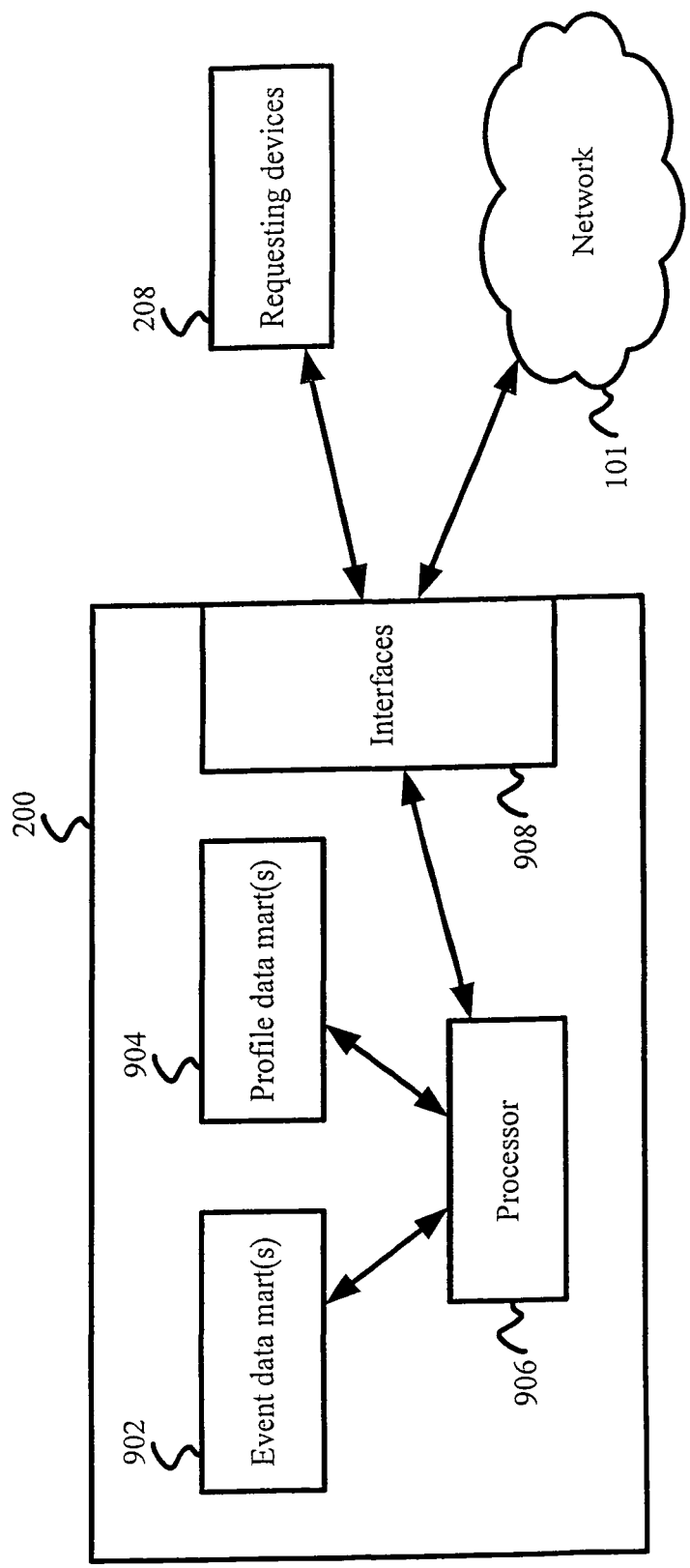
FIG. 9 is a functional block diagram illustrating an exemplary data warehouse for use in the present invention.

Referring now to FIG. 8, the method 800 by which user profiles are generated and updated is described. Per step 802, an event occurs which triggers the AMS 201. To be of concern in the profile building process, the event must comprise a tuning event, a recording event, a configuration event, or any other audience viewership-related event.

The occurrence of an event (step 802) will trigger the generation of an AMDR event message 600 at step 804. The event message 600 may be generated by the method described above with respect to FIG. 5.

If the subscriber "opts in", then the relevant personal information (PII) is added to the AMDR per step 805.

Next, the AMDR is optionally pseudonymized per step 806.

At step 808, the AMDR is transmitted to the profile generating entity (e.g., a CPE 106, hub 204, headend 202, warehouse 200, etc.).

Next, the AMDR is enriched with data from the billing system extract (in no opt-in-was selected, this data will comprise only non-PII data) per step 810.

The profile generating entity will, at step 812, determine whether a profile already exists for the user/household/CPE to which the event message 600 is associated. If no profile exists, then one will be created per step 814. The profile created will either be an unprotected profile (opt-in selected by the subscriber), or a protected profile (no opt-in).

If a profile exists at step 812, then per step 816, the configuration information of the profile is updated (if necessary). In other words, if the event message 600 includes configuration changes, these will be updated in the profile 700.

Next, per step 818, the opt-in status is determined; if opt-in is not selected, events are incorporated into the protected profile (step 820). Alternatively, if opt-in is selected, then the events are incorporated into an unprotected profile (step 822).

The updated profile 700a is stored (step 824) and the system waits (step 826) for a subsequent event.

Data Warehousing—

As discussed above, the present invention utilizes one or more data warehouses 200 for the storage and/or analysis of audience research data. The data warehouse 200 comprises one or more event data mart(s) 902, one or more profile data mart(s) 904, a processor 906, and a plurality of interfaces 908.

As discussed, collecting entities (CPE 106, VOD server(s) 105, SDS 206, etc.) will be adapted to collect audience research data and send it, in the form of AMDR event messages 600, to a data warehouse 200. The data warehouse 200 stores the event messages 600 in one or more "event data mart(s)" 902. The event data mart(s) 902 may utilize relational online analytical processing (ROLAP), multidimensional online analytical processing (MOLAP), or hybrid online analytical processing (HOLAP) to allow for analysis of the data stored in the data mart 902.

An optional aggregator (not shown) and staging entity (not shown) may be utilized prior to storage of event messages 600 at the event data mart(s) 902.

At the aggregator, the event messages 600 are temporarily stored until the warehouse 200 requests their addition to the data mart(s) 902. Utilization of an aggregator may, therefore, reduce the high flow of traffic to a warehouse 200 and ensure proper storage and utilization of received data. The aggregator may be located at an entity separate from the warehouse 200 (such as at a headend 202 or hub 204), or alternatively, may be located within the warehouse 200.

At the staging entity, the event messages 600 are prepared for utilization within the warehouse 200. Accordingly, the staging entity would be advantageously co-located with the aggregator and/or in data communication therewith. Staging may include, inter alia, cleansing and transforming the data.

As noted above, the warehouse 200 may store collected audience research information into a plurality of user profiles 700. The data warehouse 200 may share a pseudonymized version of the multitude of profiles 700 with audience research data requesting entities 208 (such as those entities which, in the past, have relied on Nielsen ratings). In another embodiment, a user is given the option to have a non-pseudonymized version of the one or more user profile(s) maintained and used in applications which involve insertion and/or recommendation of targeted content. Accordingly, user profiles 700 (pseudonymized and non-pseudonymized) are maintained at the profile data mart(s) 904 of the data warehouse 200. Similar to the event data mart(s) 902, the profile data mart(s) 904 may utilize ROLAP, MOLAP, or HOLAP to allow for analysis of the data stored in the data mart 904.

The data warehouse 200 may, in one embodiment, be adapted to utilize one or more applications to perform Nielsen-like analysis, and report results to the aforementioned requesting entities 208. These applications will be run on the warehouse 200 processor 906.

In another embodiment, the data warehouse 200 may be adapted to utilize data contained in the non-pseudonymized profile(s) to generate a list of subscriber(s) who are a part of a target demographic, then deliver targeted content to the relevant subscriber(s). This delivery may be accomplished via any of the below described content insertion and/or recommendation methods.

The interfaces 908 given in the illustrated embodiment of an exemplary warehouse 200 are utilized for connection to the HFC network 101 as well as to the requesting entities 208. The interfaces may comprise wireless and/or wired data/communication links including, inter alia, Firewire, USB, Ethernet, WiFi, WiMAX, etc.

In another embodiment, the warehouse 200 is further adapted to be in communication with one or more raw storage entities (not shown) via the aforementioned interfaces. At the raw storage, raw records (i.e., unanalyzed data) are maintained for a pre-set period of time. In one example, the raw storage entities may be adapted to maintain raw records for 13 months in a "rolling" fashion, such that once data has aged 13 months it is dropped from the storage and newer data takes its place. Exemplary raw storage entities may comprise a hybrid of storage area network (SAN), virtual tape library (VTL) and offline tape storage; however, other configurations having alternate components may be used as well.

Security—

It is appreciated that user information which could be used to personally identify a particular subscriber may be privacy-protected via a plurality of alternative methods including, in one embodiment, via a one-way cryptographic hashing function, such as the hashing functions described in co-owned and co-pending U.S. patent application Ser. No. 11/186,452 filed Jul. 20, 2005 and entitled "Method and Apparatus for Boundary-Based Network Operation," which is incorporated herein by reference in its entirety.

In the aforementioned application, the MAC address, TUNER ID and/or TUNER USE variables are hashed so that the identity of the originating CPE/subscriber is anonymous. In this manner, subscriber privacy is effectively maintained. The actual data itself (e.g., tuning history, subscriber preferences, etc.) may also be encrypted (e.g., using symmetric or asymmetric key encryption) or otherwise protected if desired, such as to prevent theft or misuse thereof, although the information is effectively of little use without knowing which subscriber originated it.

Figure 10A:
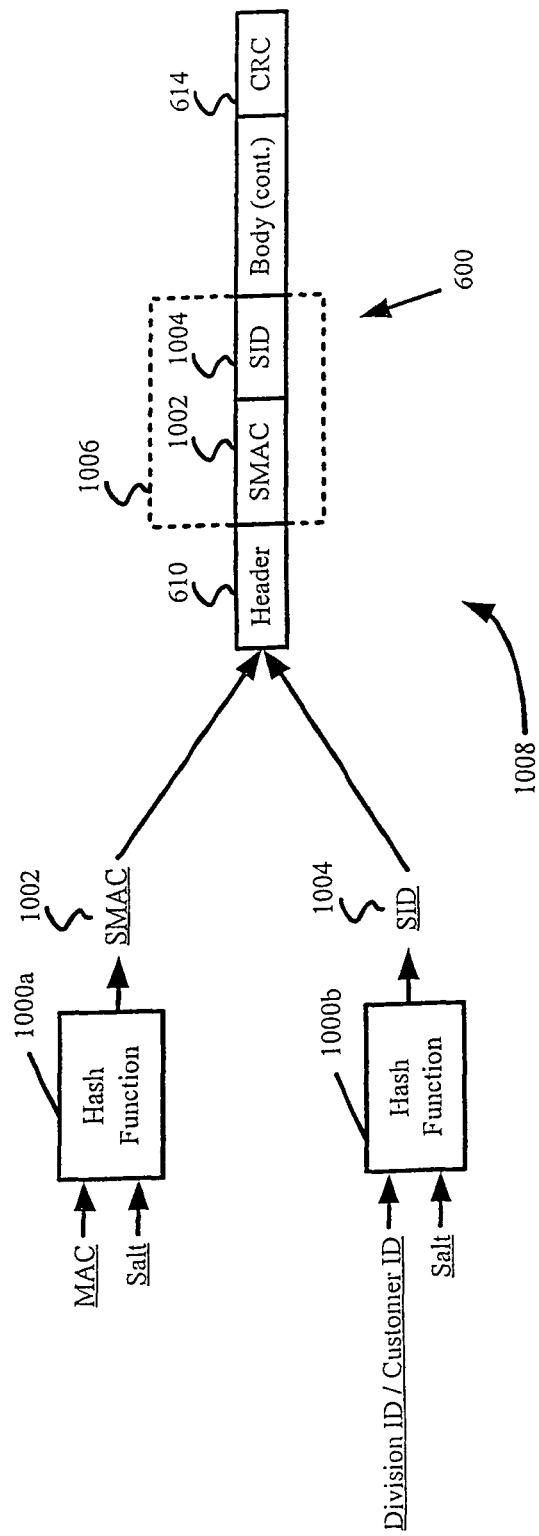
FIG. 10a is a functional block diagram illustrating the generation of a pseudonymized event message for use in the present invention.
Figure 10B:
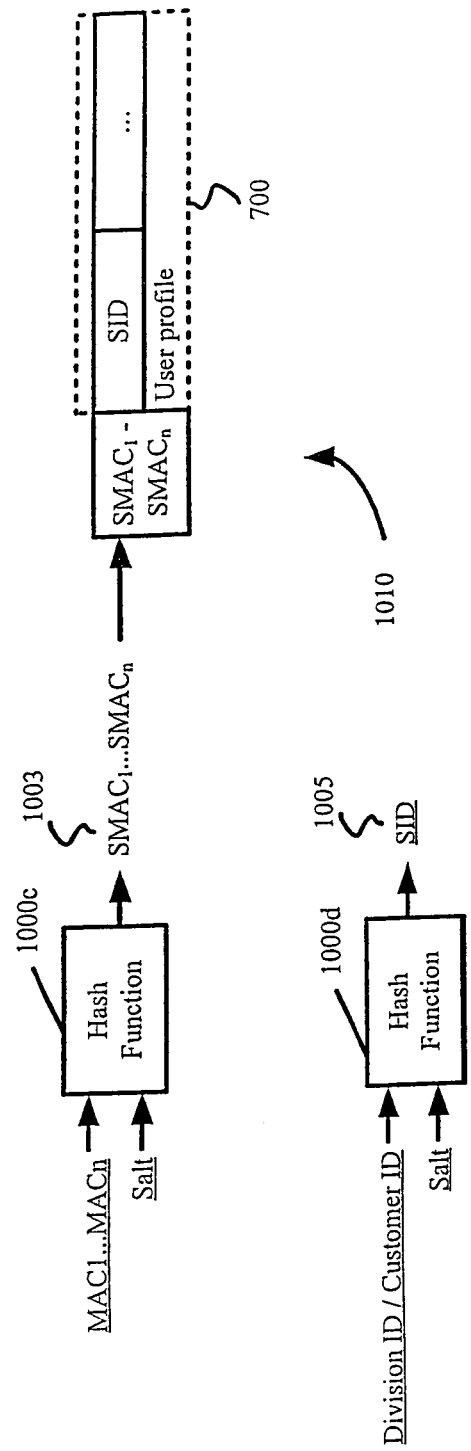
FIG. 10b is a functional block diagram illustrating the generation of a user profile.

In an alternative method of ensuring user privacy, event messages 600 and user profiles 700 (optionally) are produced via the method illustrated in FIGS. 10*a* and 10*b* respectively.

Referring now to FIG. 10*a*, one exemplary mechanism for ensuring the anonymity of an event message 600 is given. As shown, the MAC address of the CPE 106 (or other device) on which an event occurred or is associated with is incorporated into a one-way hash function 1000*a*. Random bits of information (salt) are also incorporated into the hash function 1000*a*. The resulting hash sum of the hash function 1000*a* is a salted-MAC (SMAC) 1002. The customer ID and/or division ID of the CPE 106 (or other device) on which the event occurred or is associated with is incorporated into a second one-way hash function 1000*b* alongside random salt information. The hash sum of the hash function 1000*b* is a salted-ID (SID) 1004. The two hash sums, SMAC 1002 and SID 1004, are then appended to one another to form a salted-MAC-salted-ID (SMID) 1006. The SMID 1006 is placed before the body of the event message 600 and the remainder of the body is then encrypted; e.g., using asymmetric encryption via a public/private key algorithm, where the private key is used at the data warehouse 200 and the body 612 is part of the payload. Note that in this embodiment, the header 610 and CRC are open so that the message 600 may be tracked and consistency ensured before attempting to decrypt the body.

Referring now to FIG. 10*b*, the mechanism for associating events from various CPE to the same household in a pseudonymized fashion to build the protected profile 700 is given. As shown, a billing system extract 1010 has been created and is maintained separately, wherein, for each Customer, as defined by a Customer Account Number (Customer ID) and Division ID, non-PII household information is stored (e.g. Zip Code+2, etc.). Additionally, each CPE associated with the Customer ID/Division ID is stored in the extract 1010, along with non-PII data related to the CPE (e.g. Model Number, firmware version, etc.). In order to build the billing extract, each Customer ID/Division ID combo (appending the Division ID to the Customer ID) is subjected to a salted, one-way hash, with the same pre-determined salt used to pseudonymize event messages 600. For each CPE associated with that SID, the MAC address is subjected to a salted, one-way hash, with the same pre-determined salt used to pseudonymize the MAC address in the event message 600. In this way, the billing extract fully describes a household with all its related CPE, allowing correlation of event messages 600 to a household having no PII on that household.

The security implementations of FIGS. 10*a* and 10*b* give the AMS 201 the ability to identify a household's equipment without tying the equipment to any particular customer, thereby allowing the AMS 201 to "know" viewership patterns of a particular piece of equipment within a household and usage patterns within a household in general without correlating the patterns to any one customer or physical address.

Protected Profile Aggregation for Targeting—

The protected profiles generated via the mechanisms described herein, i.e., one profile per pseudonymized household, represent far too granular a level of detail to make useful bulk targeting decisions. Therefore, one embodiment of the present invention utilizes a mechanism to aggregate these "protected profiles" into a plurality (e.g., N) targeting profiles.

Targeting profiles are definable via any type of information contained in the event message. So, for example, one of the N targeting profiles could be defined as: households with a DVR settop box (information obtained from the billing extract), with a standard definition (SD) settop box with no DVR, with high speed data, and who have not seen a particular offer before. The offer associated with the targeting profile could be for example an advertisement or promotion informing customers that, if they switch their voice service to a specific provider, they'll be entitled to exchange their SD box for another having a DVR.

The data warehouse is able to associate all households for which such an advertising or promotional campaign would be applicable to the targeting profile, providing interested parties with a clear understanding of exactly how many households the campaign will reach.

Another example of a targeting profile might comprise grouping a population of households into pre-defined categories, then "selling" advertisements to those specific categories, and informing advertisers as to the number of households to which these advertisements will apply. Perhaps a division may wish to break up the population of say New York City into the following general groupings:

1) Young Affluents/Trendsetters/No Family
2) Young Workers/Bar Goers/No Family
3) Middle Aged Single Affluent
4) Middle Aged Single Working
5) Middle Aged Affluent Caucasian Families
6) Middle Aged Affluent Latino Families
7) Middle Aged Affluent African American Families
8) Middle Aged Affluent Asian Families
9) Middle Aged Affluent Race Unidentifiable Families
10) Middle Aged Working Caucasian Families
11) Middle Aged Working Latino Families
12) Middle Aged Working African American Families
13) Middle Aged Working Asian Families
14) Middle Aged Working Race-Unidentifiable Families
15) Older Affluent
16) Older Working Through evaluation of various aspects of the household protected profile, each household could be placed into one of these categories. As an example, perhaps the business rules to place a person in the "Middle Aged Working Asian Families" category (13) above are as follows: (1) zip code+2 one of {X, Y, or Z}; (2) watches at least 4 hours of children's programming per week; (3) watches at least 2 hours of specific services per week (e.g. those specifically put in place for or applicable to Asian viewers); (4) watches at least 2 hours of programming typically ascribed to women; and (5) watches at least 2 hours of programming typically ascribed to men.

Through building such "targeting profiles", advertisers or other interested prospective network users could be provided information as to specific potential views or "impressions" within given categories or profiles; e.g., that there are 35,000 households in a first targeting profile, 45,000 households in a second targeting profile, and so forth. This advantageously allows for the aforementioned "bulk" targeting decisions through use of the aggregated "granular" data generated via the mechanisms previously described herein.

Targeted Content Insertion and/or Recommendation—

In general, there are two types of real-time targeting opportunities available under current architectures (e.g., as specified by the well known DVS 629 and SCTE 130 standards, and SCTE 35 and SCTE 30 relating to inband digital advertisement insertion point cues and messaging to an advertising server, respectively, the foregoing each incorporated herein by reference in its entirety): (1) linear spot advertisement replacements and (2) on-demand bookend advertisements. In either of these cases, an advertising decision service (ADS) must determine what advertisement to place.

In terms of linear spot advertisement replacements (for on-demand bookend advertisements), when a VOD session setup occurs (which may comprise a Startover, Lookback, or standard VOD), an indication is made to the ADS, and as a result the ADS indicates which asset should be "pre-rolled" on the VOD asset.

Based on present infrastructure, there is currently insufficient bandwidth to allow unicast linear spot advertisement replacement. Therefore, a multicast mechanism is used to replace spot advertisements. The current mechanism for this multicasting is the use of advertising zones. Advertising zones simply separate a division into different areas or regions based on a logical criterion such as geography. Currently, advertisements are picked for each advertising zone well in advance of any insertion opportunity. Another approach that can allow for more granular targeting is to target to broadcast switch architecture (BSA) Service Groups; see discussion of FIG. 1c herein for an exemplary BSA architecture. This targeting approach is still geographic but, in general, has a much smaller number of settops than an advertising zone. It is important to note that the ADS must select an advertisement to insert based on all the settops (CPE) in a geographic area. Whether employing unicast targeting or multicast targeting, the ADS must be given enough information to make the decision when an insertion opportunity (broadcast or otherwise) arises. Since under the exemplary embodiments of the present invention, advertisements are available for insertion based on "targeting profiles" as described above, the ADS must know which "targeting profile" is best and, by extension, which advertisement is best for a given opportunity. Three ways for the ADS to be given this information are now described, although it will be appreciated that other techniques may be used.

In a first approach, the CPE (e.g., settop) knows what targeting profiles to which it belongs. In this case, a messaging infrastructure between a headend component (such as for example an AMDR source described elsewhere herein) sends all current or existing targeting profiles to the CPE. The CPE store them and, based on the behavior of the customer on that particular device, determine which targeting profiles are applicable. In one variant, a weighted approach is used; e.g. ordered list from "best fit profile" to "least fit profile" or the like). Then, the CPE publishes on to the headend device (or another designated device, such as a network proxy) the weighted list of targeting profiles of which it is part. This "publication" may be according to any number of different schemes including e.g., periodically, upon the occurrence of a given event (e.g., CPE startup, shutdown, etc.), or upon a request or "pull" from a network entity such as the AMDR source. In a second approach, the collector stores in memory all activity associated with a given CPE, and in real-time assigns the CPE to the appropriate subset of profiles (again, such as via an exemplary weighting or ranking scheme). Since the collector is acting as AMDR source, this information is being collected regardless, and hence is already present in the network without further infrastructure upgrade or enhancements.

Using either of the aforementioned mechanisms to determine in real-time the appropriate targeting profile when an insertion opportunity occurs, the ADS can simply make the appropriate selection for unicast targeting. However, for multicast targeting, an additional step is necessary. Before determining the most appropriate targeting profile for a specific insertion opportunity, the ADS generates an "average targeting profile" for all the CPE in the targeting group (either on an advertising zone or BSA service group basis). This step allows for an extrapolation of sorts of the results for individual CPE to the plurality of members of the multicast group, thereby providing for a "best fit" for the aggregate of the CPE.

In another embodiment of the invention, advertising or promotional content can be statically or dynamically inserted into content based on patterns observed at the aforementioned optional profiling step via the mechanism described in co-pending and co-owned U.S. patent application Ser. No. 11/441,476 entitled "Secondary Content Insertion Apparatus and Methods" filed May 24, 2006, and incorporated herein by reference in its entirety. The aforementioned application describes exemplary methods and apparatus for delivering content to a secondary location via a personal content server or PCS (including selective substitution of advertising or promotional content more germane to the secondary location and/or delivery time). Hence, in one embodiment, data derived from the target profile based approach described herein may be utilized in conjunction with the aforementioned PCS to select advertising/promotional content that is optimized for such instances.

In other embodiments, the delivery of targeted content may be accomplished by directing the relevant subscribers to tune to an unused transmission channel for receipt of a substitute set of advertisements, such as via the targeting advertisement methods described in co-owned and co-pending U.S. patent application Ser. No. 10/639,070 filed Aug. 12, 2003 and entitled "Technique for Effectively Delivering Targeted Advertisements Through a Communications Network Having Limited Bandwidth," which is incorporated herein by reference in its entirety. The relevant subscribers may have their CPE 106 forcibly tuned to the unused channel based on commands sent from the headend or other network location (e.g., via an immediate update to their program mapping table, via existing BSA client protocols, or the like) so as to present a seamless and effortless transition to the subscriber, or alternatively a new program stream can be instantiated (e.g., using the aforementioned BSA techniques) with the relevant advertising or promotional content spliced therein, the user's CPE 106 then being directed to tune to the newly generated program channel.

In yet another embodiment, data in user profiles 700 may be utilized for comparison to metadata in a plurality of available advertisements in order to enable a viewer to individually preview and select the advertisements that they will view. This comparison and subsequent presentation of targeted advertisements may occur via, for example, the methods described in co-owned, co-pending U.S. patent application Ser. No. 12/070,559 filed Feb. 19, 2008 and entitled "Methods and Apparatus for Enhanced Advertising and Promotional Delivery in a Network" which is incorporated herein by reference in its entirety. The methods and apparatus enable a viewer to individually select and view advertisements during real-time broadcast program settings, as well as during "trick mode" operation in recorded program settings. Guess-work associated with skipping commercials via manual fast-forwarding through recorded content is eliminated, and a viewer is presented with several options regarding which advertisements to view and when to view them. In one variant, decoupling of advertising or promotions from a previously recorded program is provided, thus affording the network operator flexibility to insert various advertising content options, or selectively replace dated or expired advertisements, or those having less correlation to a current program content stream. In another variant, advertising or commercial skipping is substantially frustrated by presenting a viewer with several viewing options.

Software Architecture—

As noted above, many of the functions of the AMS 201 are enabled within the associated entities via the one or more software applications. It will be appreciated by those of ordinary skill that while exemplary software embodiments are described herein, other variations and combinations of the following architectures may be utilized depending on the desired attributes and network topology in use. For example, distributed applications (DAs) or client-server configurations may be used with the invention.

The exemplary configuration of the AMS 201 relies on the ability of various entities to perform the following: (i) collect data regarding audience viewership for subsequent utilization and/or analysis, (ii) send audience research information to a destination (via a route including one or more intermediary in one embodiment), (iii) store the information as a protected profile, (iv) optionally analyze the data contained in one or more profile, (v) send the protected data to a requesting entity; and (vi) optionally utilize data contained in a non-protected profile to insert and/or suggest content.

Accordingly, at least an AMDR source 302 and an AMDR destination 304 must comprise one or more computer applications running on the processor thereof Further, where the AMS 201 optionally includes one or more intermediate devices (i.e., devices which serve as both sources 302 and destinations 304), the intermediate devices will also require one or more computer applications.

In one embodiment, described with regard to FIG. 2 above, an SDS 206 associated with one of a plurality of hub 204 comprises the source 302. VOD audience research data is collected by a VOD server 105, making the VOD server 105 the source 302 for CPE 106 and/or other devices (including mobile user devices 214 as given in FIG. 2a) which request VOD programs. Further, in a home network 230 environment (illustrated in FIG. 2b), audience research data (i.e., data gained from events occurring on the devices of the network 230) is collected by the CPE 106 as the source 302.

Figure 11A:
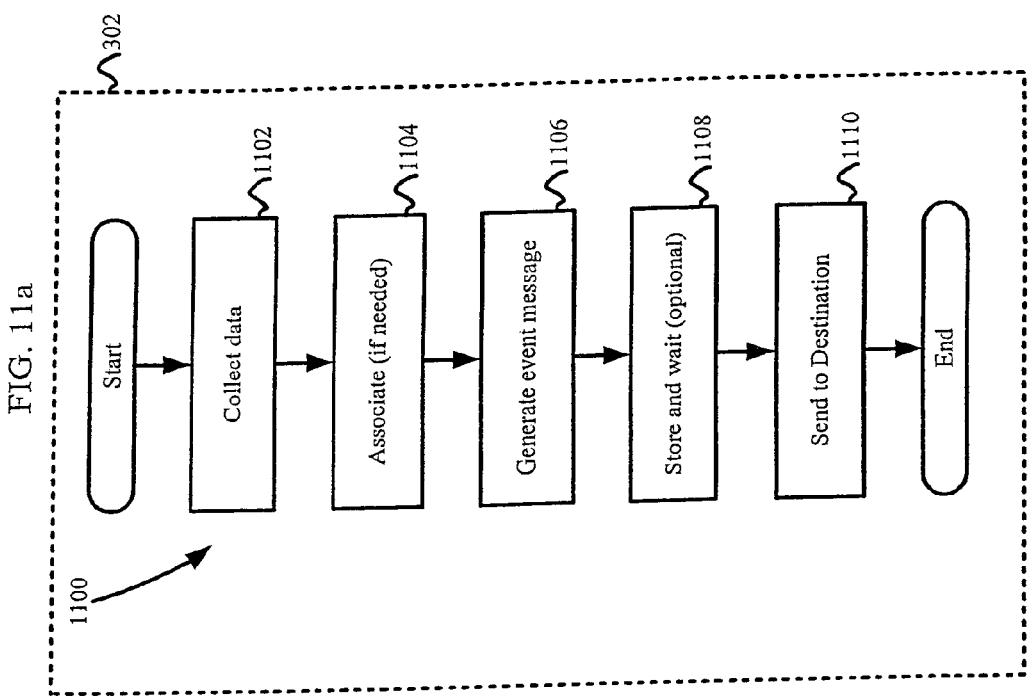
FIG. 11a is a logical flow diagram illustrating the functioning of an exemplary source entity in the present invention.

The exemplary computer application for use with any one of the abovementioned collecting entities, or initial sources 302 (SDS 206, VOD server(s) 105, CPE 106) will have a function 1100 given by the diagram of FIG. 11a. In other words, an exemplary computer application running on an initial source 302 device will be adapted to cause the source 302 to perform the overall function 1100 which is comprised of a series of sub-functions.

First, at step 1102, the source 302 will be adapted to collect audience research data. As noted above, audience research data comprises any data regarding viewership. For example, the audience research data may comprise, inter alia, the size of the audience for any particular program, geographical locations of viewers, and demographic makeup of viewers, etc. Audience research data may also include data which relates to the utilization of trick mode operations (such as stop, fast forward, rewind, etc.) during a program. Audience research data is collected in the form of event records (discussed above).

At this point, the audience research data (or event records) may be associated with a particular CPE 106, user, or household if necessary. For example, in an instance where the audience research data comprises a VOD tuning event, and thus the source 302 is a VOD server 105, the exemplary computer application must enable the source 302 to associate the event to the particular CPE 106 (or other device) which requested the program.

Once the proper association (if any) is made, at step 1106, the exemplary computer application enables the source 302 to generate an AMDR event message 600. In one embodiment, the event message 600 is of the type discussed with respect to FIG. 6 and the exemplary message 600 is generated via the method 500 discussed above with respect to FIG. 5.

In one embodiment, the source 302 is adapted to store the generated messages 600 and wait for a command from a destination 304 before (per step 1110) sending the messages 600 to the destination 304. In other words, in one embodiment, messages 600 will only be sent to the destination 304 sporadically or opportunistically; alternatively, at step 1110, the source 302 will immediately send the messages to a destination 304.

As noted, in one embodiment, the initial source 302 will send the information (given in step 1110 above) to an intermediary 1111 which first acts as a destination 304, and subsequently as a source 302. The exemplary computer application adapted to run on the processor of the intermediary 1111 enables the intermediary 1111 to have the function 1120 given by the steps listed in FIG. 11*b*.

Figure 11B:
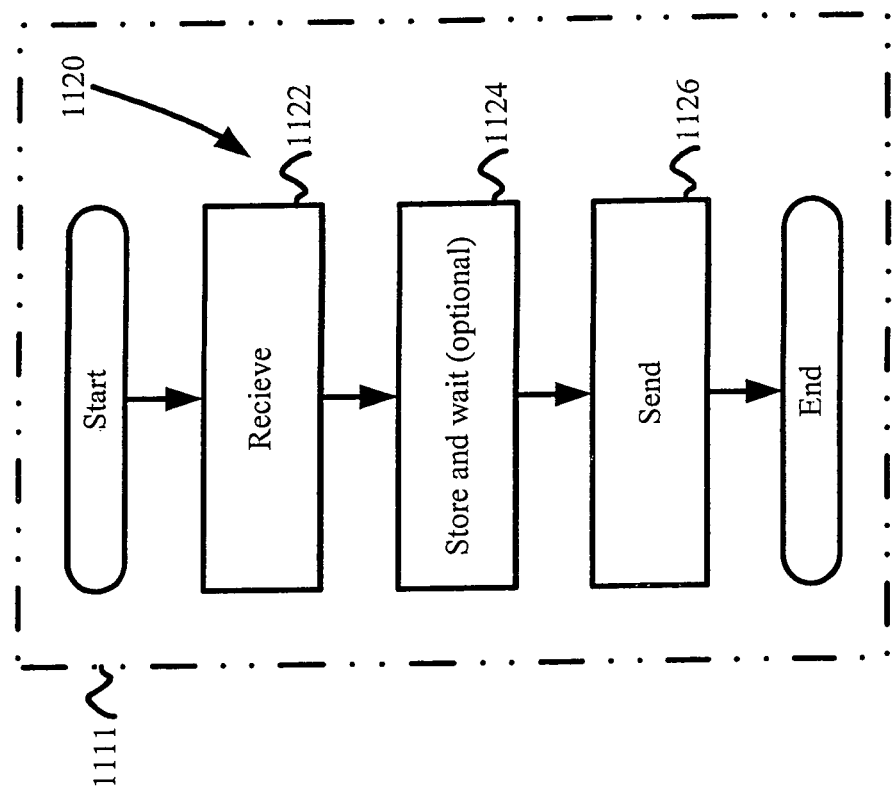
FIG. 11b is a logical flow diagram illustrating the functioning of an exemplary intermediary entity in the present invention.

At step 1122 of FIG. 11*b*, the intermediary 1111 acts as a destination 304 and receives one or more messages 600 from a source 302. As noted above, in one embodiment, the computer application is adapted to cause the intermediary 1111 to store the messages 600 and wait for a command from a destination 304 at 1124. Alternatively, the intermediary 1111 may immediately act as a source 302 and send the messages 600 to a destination 304 at step 1126.

Figure 11C:
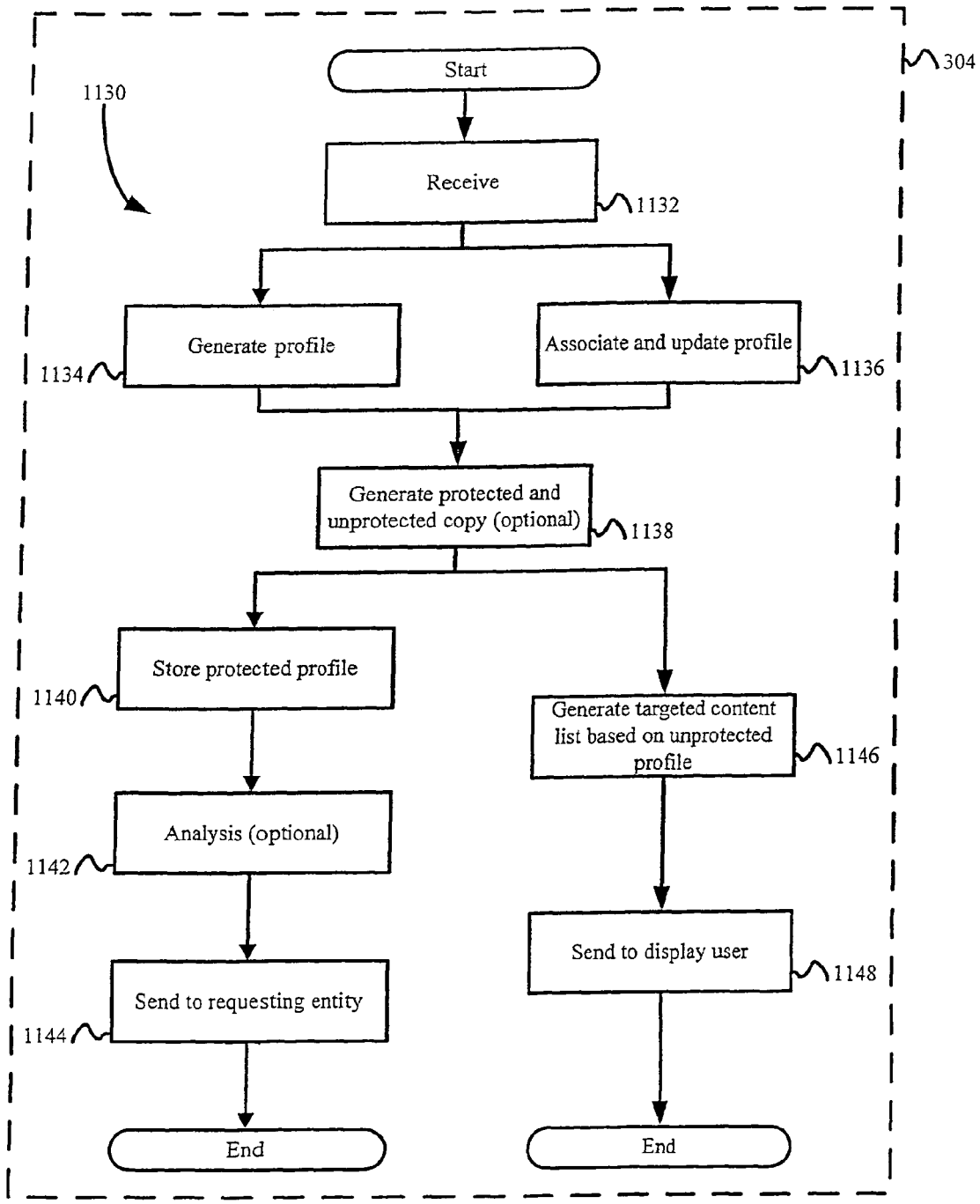
FIG. 11c is a logical flow diagram illustrating the functioning of an exemplary destination entity in the present invention.

Referring now to FIG. 11*c*, an exemplary functionality 1130 enabled within a final destination 304 via one or more exemplary computer applications is described. As previously explained, the final destination 304 is the last destination in the AMS 201 (i.e., that is not an intermediary 1111). The final destination 304 may comprise for example a data warehouse 200 as given in FIGS. 2-2*b* above, or even another proxy or designated third-party entity.

An exemplary computer application will be adapted to enable the destination 304 to, at step 1132, receive one or more messages 600 from a source 302. At step 1134, the destination 304 will either generate a user profile 700 (such as for an individual or for a household or premises) if one has not already been created; or, associate the messages 600 with a previously created profile 700 and update the profile 700 with the message 600 data.

At step 1136, the destination 304 application causes an unprotected copy of the profile 700 to be generated only if the user has indicated that this step should be performed (hence making it optional). Then, at step 1138, the unprotected copy of the profile 700 is utilized to generate a list of targeted content such as via the previously described methods. In other words, if the user selects to have information used in this fashion, the profile will be compared to metadata regarding available primary and secondary content for insertion and/or recommendation as discussed above. The list of targeted content is then directed to be sent to a user's display by the exemplary computer application at step 1140.

If the user does not indicate a willingness to have his/her user profile 700 utilized as described above, no unprotected copy will be generated at step 1136, and the subsequent steps utilizing the unprotected copy of the profile 700 will be obviated.

At step 1142, a protected copy of the new or updated profile 700 is created. The protected copy is stored (at 1144) and, at 1146, optionally analyzed by the destination 304. The protected (and optionally analyzed) profiles 700 are directed to be sent to a requesting entity 208 at 1148.

Business Methods and "Rules" Engine—

In another aspect of the invention, the aforementioned AMS 201 (e.g., rendered as one or more computer programs) optionally includes an operations and/or business rules engine. This engine comprises, in an exemplary embodiment, a series of software routines running on the various sources 302, intermediaries 1111, and destinations 304, or other associated hardware/firmware environment that are adapted to control the operation of the transmission and analysis of audience research data. These rules may also be fully integrated within the aforementioned one or more computer programs and be controlled via the entity on which the program is run. In effect; the rules engine comprises a supervisory entity which monitors and selectively controls the transmission and analysis functions at a higher level, so as to implement desired operational or business rules.

The rules engine can be considered an overlay of sorts to the algorithms of the previously described one or more computer applications having general function 1100, 1120 and 1130. For example, the exemplary computer application at the destination 304 may invoke certain operational protocols or decision processes based on data received (e.g., historical activity data, subscriber preferences, etc.), as well as network operational or historical data, demographic data, geographic data, etc. However, these processes may not always be compatible with higher-level business or operational goals, such as maximizing profit on a network-wide basis (or after consideration of other factors not examined by the collecting entities such as advertising revenue, RTA/acquisition costs, "costs" of delivering streams based on required bandwidth, taxes, maintenance or repair costs, additional equipment leasing or use costs, etc.), or system reliability and/or flexibility. Moreover, the destination 304 application may be operating on a per-CPE, per-household, or per-request basis (i.e., evaluating each individual CPE effectively in isolation, and generating a decision or recommendation without considering larger patterns or decisions being made in the service group or network as a whole).

Hence, when imposed, the business/operational rules can be used to dynamically (or manually) control the operation of the aforementioned processes in conjunction with the analysis and transmission functions previously described.

For example, one rule implemented by the rules engine may comprise selectively transmitting or analyzing event messages 600 only from certain users; e.g., those who have agreed to have their viewership data collected. Accordingly, only those users who affirmatively agree will have audience research data collected about their household or CPE 106. In another variant, insertion and/or recommendation of targeted content is provided only to users who agree to have viewership data collected.

As noted throughout, a user may elect in the present invention not to have personal identifying information or data regarding viewership collected and transmitted, and/or not to have any such data collected utilized for targeted content generation and insertion and/or recommendation. Thus, an incentive may be offered to those users who affirmatively agree to collection and transmission of audience research data and/or to targeted insertion or recommendation of content. For example, a user may be offered the targeted content free or at a reduced price (if it is purchasable content, such as VOD, Pay-per-View etc.), or may be offered other services at no charge or at a reduced price.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A data collection entity for use in a content delivery network, said data collection entity communicates with at least one of a plurality of consumer premises equipment (CPE) in said content delivery network, said data collection entity comprising:
   an apparatus that collects a plurality of audience viewership event data from at least one of said plurality of CPE, said plurality of audience viewership event data associated with one or more events which occur on said at least one CPE;
   a digital processor, said digital processor runs at least one computer application thereon, said at least one computer application comprising a plurality of instructions which when executed:
   generate an event message for individual ones of said plurality of audience viewership event data collected, said event message comprising an identifier, said identifier comprising a first output of a first one-way hash function and a second output of a second one-way hash function, said first one-way hash function comprising a hash of a first salt value and a media access control (MAC) address of said at least one CPE, and said second one-way hash function comprising a hash of a second salt value and a customer identifier; and
   identify information contained in said event message which is not stored in said plurality of audience viewership event data that has been previously collected; and
   an interface, said interface that sends said event message to a destination.

2. The data collection entity of claim 1, wherein said destination comprises at least one of:
   another data collection entity; or
   a storage entity.

3. The data collection entity of claim 1, wherein said destination comprises a data warehouse configured to store said plurality of audience viewership event data into one or more profiles, said one or more profiles each configured to correspond to individual ones of said plurality of CPE.

4. An audience measurement system that collects and analyzes a plurality of viewership events which occur on a plurality of client devices in a content delivery network, said audience measurement system comprising:
   at least one processing entity which:
   receives and analyzes event messages to generate a plurality of audience research data;
   generates one or more records based at least on said audience research data and user-profile data; and
   pseudonymizes user-identifiable information of said one or more records based at least in part on collected user preference information;
   a data warehouse that stores said one or more records that had said user-identifiable information pseudonymized; and
   at least one headend entity in data communication with said data warehouse;
   wherein said one or more at least partly pseudonymized records are transmitted via said at least one headend entity to said data warehouse; and
   wherein said pseduonymization of said user-identifiable information comprises performance of a first hash function comprising a hash of a first random value and a media access control (MAC) address of a client device associated to said user-identifiable information, and performance of a second hash function comprising a hash of a second random value and an identifier associated to a user of said client device.

5. The system of claim 4, wherein said system further comprises at least one hub entity in data communication with said at least one headend entity and at least one of said plurality of client devices, and collects said plurality of audience research data from at least one of said plurality of client devices, and send said audience research data to said at least one headend entity.

6. The system of claim 4, wherein said at least one headend entity comprises a video on demand (VOD) server, and said plurality of data comprises VOD-related audience measurement data.

7. The system of claim 4, wherein said data warehouse stores said plurality of data into one or more profiles, said one or more profiles each configured to correspond to individual ones of said client devices.

8. The system of claim 7, wherein said one or more profiles are maintained anonymously by at least one hash function run on unique identifying information associated with at least one said client device to which individual ones of said plurality of event messages relate.

9. The system of claim 4, wherein at least one of said plurality of client devices comprises a home network having a plurality of media devices in communication therewith, and said plurality of data is collected by said home network, said data comprising audience measurement data of one or more of said plurality of media devices.

10. The system of claim 4, further comprising:
   at least one gateway in data communication with said content delivery network; and
   at least one wireless service provider network in data communication with a gateway network created via said at least one gateway;
   wherein at least one of said plurality of client devices comprises a mobile client device, said mobile client device communicates with said headend entity of said content delivery network via said wireless service provider network and said gateway network.

11. A method of managing user profiles in a network, said method comprising:
   collecting a plurality of audience viewership event data from at least one of a plurality of client devices, said plurality of audience viewership event data associated with one or more events occurring on said at least one client device;
   generating an event message for individual ones of said plurality of audience viewership event data collected, said event message comprising an identifier, said identifier comprising a first output of a first one-way hash function and a second output of a second one-way hash function, said first one-way hash function comprising a hash of a first salt value and a media access control (MAC) address of said at least one client device, and said second one-way hash function comprising a hash of a second salt value and a customer identifier;
   identifying information contained in said event message which is not stored in said plurality of audience viewership event data that has been previously collected; and
   sending said event message to a destination.

12. The method of claim 11, wherein said destination comprises at least one of: (i) another data collection entity; or (ii) a storage entity.

13. The method of claim 12, wherein destination entity comprises a data warehouse configured to store a plurality of user profiles, said plurality of user profiles each relating to individual ones of said plurality of client devices of a household in said network.

14. The method of claim 13, further comprising correlating said event message to at least one of said plurality of user profiles.

15. The method of claim 11, wherein said plurality of audience viewership event data comprises data regarding events occurring on at least one of said plurality of client devices of said network.

16. A method for collecting and analyzing a plurality of viewership events occurring on a plurality of client devices in a content delivery network, said method comprising:
   receiving and analyzing event messages for generating a plurality of audience research data;
   generating one or more records based at least on said audience research data and user-profile data;
   pseudonymizing user-identifiable information of said one or more records based at least in part on collected user preference information; said pseduonymizing of said user-identifiable information comprises performance of a first hash function comprising a hash of a first random value and a media access control (MAC) address of a client device associated to said user-identifiable information, and performance of a second hash function comprising a hash of a second random value and an identifier associated to a user of said client device; and
   storing said one or more records that had said user-identifiable information pseudonymized.

17. The method of claim 16, wherein said event messages comprise audience viewership and said event messages are associated with one or more events occurring on at least one of said plurality of client devices associated with said content delivery network.

18. The method of claim 16, wherein said act of generating one or more records comprises correlating individual ones of said plurality of audience research data to a data set associated with individual ones of said plurality of client devices within said content delivery network.

19. The method of claim 18, wherein said data set associated with individual ones of said plurality of client devices maintains user anonymity by said act of pseudonymizing.

20. The method of claim 16, further comprising sending a portion of said generated one or more records based at least on said audience research data and user-profile data to a third-party content delivery network.

21. The method of claim 16, wherein a user associated with said user profile may opt-in to user-identifiable participation.

22. The method of claim 16, further comprising sending a portion of said generated one or more records based at least on said audience research data and user-profile data at least one headend entity.

23. The method of claim 22, wherein said at least one headed entity comprises a video on demand (VOD) server, and said event messages comprises VOD-related audience measurement data.

24. The method of claim 16, wherein said act of storing further comprises sending said one or more records that had said user-identifiable information pseudonymized to a data warehouse for storing.

* * * * *